(12) United States Patent
Weizman et al.

(10) Patent No.: US 9,887,919 B2
(45) Date of Patent: Feb. 6, 2018

(54) TECHNIQUES AND SYSTEMS FOR LOGICAL MESH NETWORKS

(71) Applicant: INTEL CORPORATION, Santa Clara, CA (US)

(72) Inventors: Raz Weizman, Beer Sheva (IL); Noam S. Brousard, Tel Aviv (IL)

(73) Assignee: INTEL CORPORATION, Santa Clara, CA (US)

(*) Notice: Subject to any disclaimer, the term of this patent is extended or adjusted under 35 U.S.C. 154(b) by 119 days.

(21) Appl. No.: 15/089,176

(22) Filed: Apr. 1, 2016

(65) Prior Publication Data

US 2017/0289038 A1 Oct. 5, 2017

(51) Int. Cl.
| | |
|---|---|
| *H04L 12/741* | (2013.01) |
| *H04L 12/933* | (2013.01) |
| *H04L 12/947* | (2013.01) |
| *H04W 24/02* | (2009.01) |

(52) U.S. Cl.
CPC ........ *H04L 45/745* (2013.01); *H04L 49/1584* (2013.01); *H04L 49/252* (2013.01); *H04W 24/02* (2013.01)

(58) Field of Classification Search
CPC . H04L 45/745; H04L 49/1584; H04L 49/252; H04W 24/02
See application file for complete search history.

(56) References Cited

U.S. PATENT DOCUMENTS

| | | | |
|---|---|---|---|
| 6,968,153 B1 | 11/2005 | Heinonen et al. | |
| 2003/0202477 A1 | 10/2003 | Zhen et al. | |
| 2012/0057518 A1 | 3/2012 | Herrala et al. | |
| 2014/0105081 A1* | 4/2014 | Yamamoto | H04L 12/40019 370/310 |
| 2015/0065053 A1 | 3/2015 | Cho et al. | |
| 2015/0085853 A1 | 3/2015 | Smith et al. | |
| 2017/0222923 A1* | 8/2017 | Hui | H04L 45/70 |

FOREIGN PATENT DOCUMENTS

| | | |
|---|---|---|
| JP | 2003273849 A | 9/2003 |
| KR | 20070013434 A | 1/2007 |
| KR | 20150138869 A | 12/2015 |

OTHER PUBLICATIONS

International Search Report received for PCT Patent Application No. PCT/US2017/024855, dated Jul. 4, 2017, 4 pages.
International Search Report received for PCT Patent Application No. PCT/US2017/024859 dated Jul. 4, 2017, 4 pages.

* cited by examiner

*Primary Examiner* — Duc C Ho

(57) ABSTRACT

Various embodiments are described wherein a set of devices are configured to be a logical mesh network. Each device has a logical mesh network address. Further, the set of logical mesh network addresses form a sequence from a first address to a last address, and intermediate addresses having both a preceding and a next address. The devices store forwarding information used to determine how to forward a received logical mesh network packet. Other embodiments are described and claimed.

24 Claims, 18 Drawing Sheets

System 100

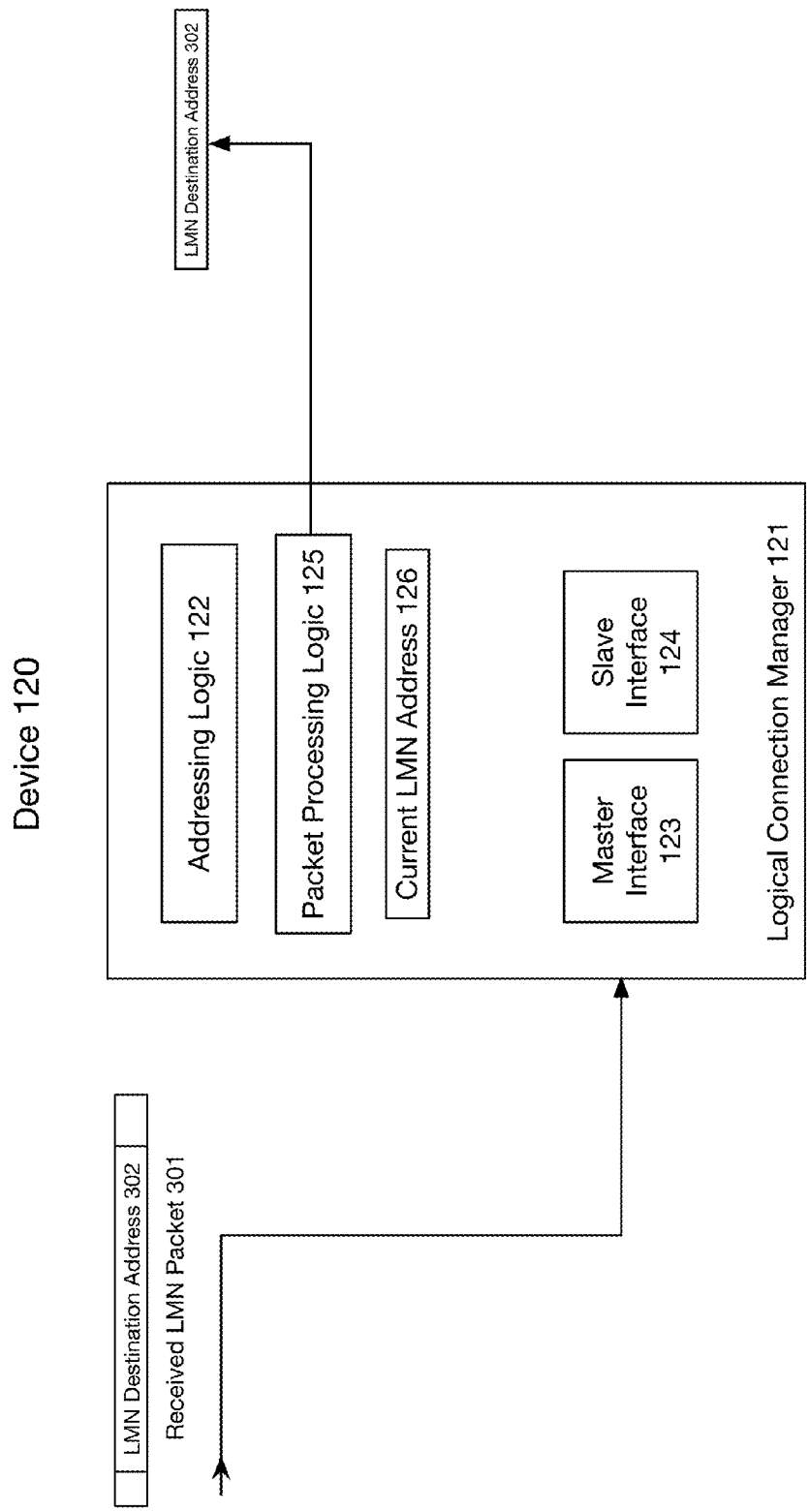

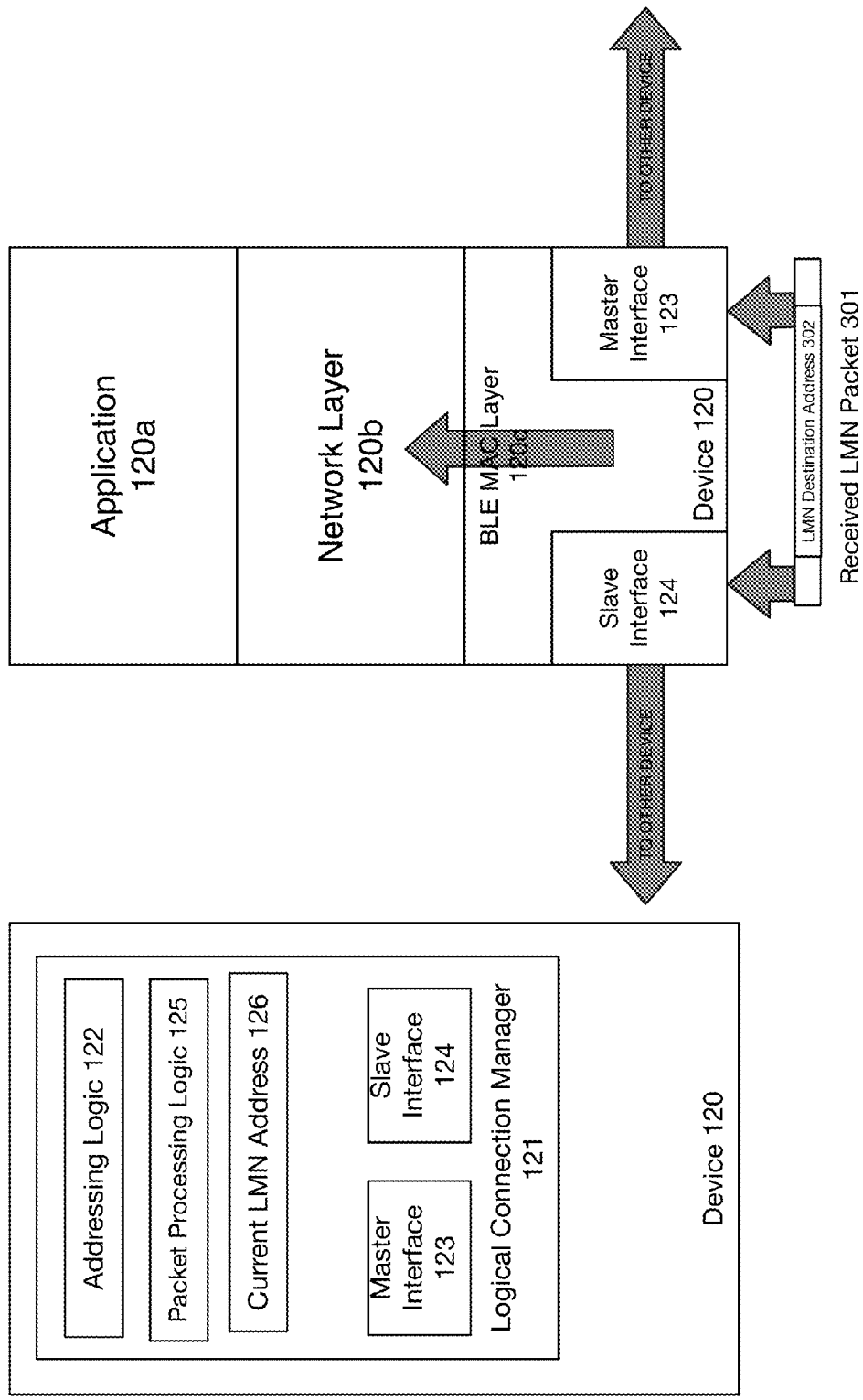

TECHNIQUES AND SYSTEMS FOR LOGICAL MESH NETWORKS

TECHNICAL FIELD

Embodiments are disclosed directed to logical mesh networks based on wireless links.

BACKGROUND

Network specifications (or network protocols) may set forth various requirements for devices to meet in order to achieve particular functionality on a network. For example, a particular network specification may require a certain message exchange sequence in order for two devices to connect. Another example would be a network protocol that required a particular format for network addressing.

While network specifications enable certain functionality, they may limit other functionality. For example, if a network protocol requires a particular message exchange sequence to establish a connection, then using a different sequence may result in devices being unable to connect. Similarly if a particular network addressing format is required, then using a network address with a different format may have disable network functionality.

BRIEF DESCRIPTION OF THE DRAWINGS

FIG. 3 depicts an embodiment of a device.

FIG. 5A depicts an embodiment of an aspect of network traffic flow in a device.

FIG. 5B depicts an embodiment of an aspect of network traffic flow in a device.

DETAILED DESCRIPTION

Figure 1:
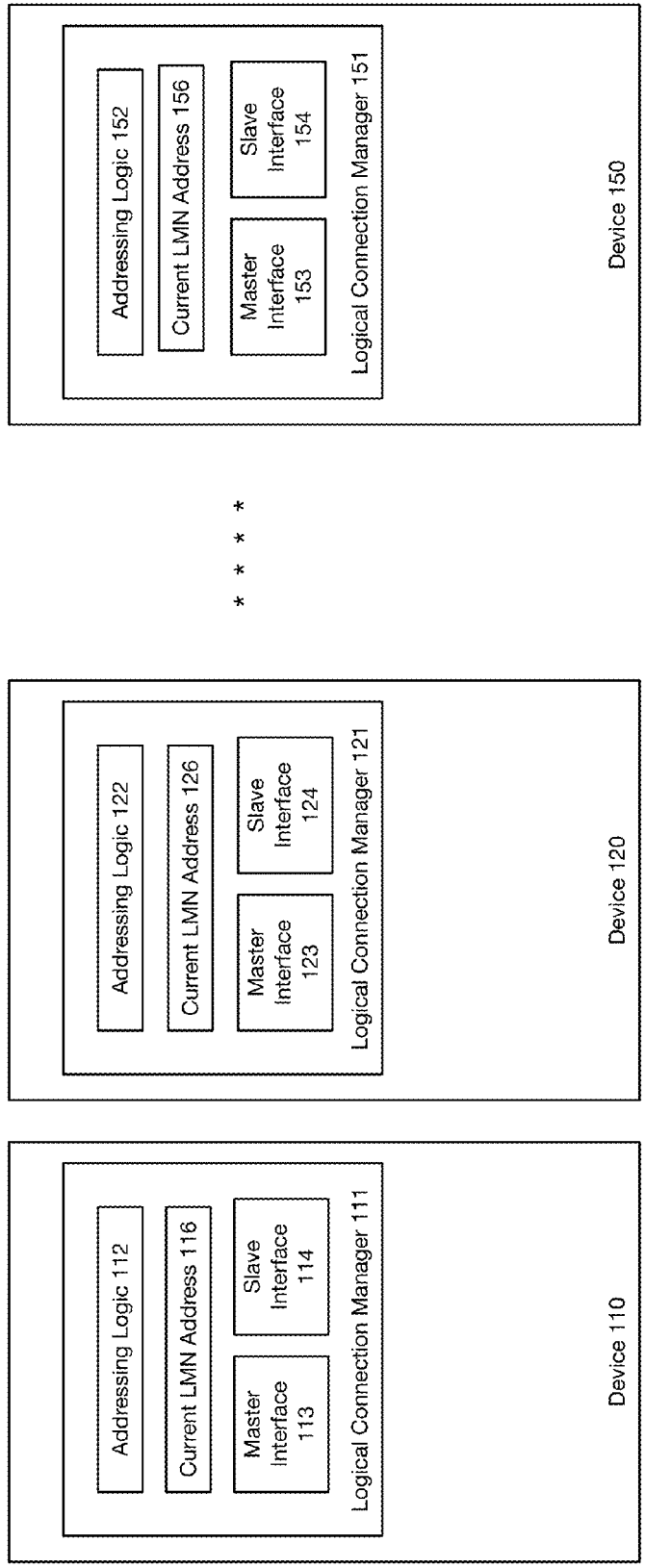
FIG. 1 depicts an embodiment of devices configured to be in a logical mesh network.

Embodiments are generally directed to wireless communication networks. Some embodiments are particularly directed to enhanced techniques to improve management and communications between a set of wireless devices, such as wireless mobile devices, for example. The wireless mobile devices may be arranged to communicate in accordance with one or more wireless communication protocols. In one embodiment, for example, the wireless mobile devices may communicate using a wireless communication protocol defined by the Bluetooth Special Interest Group (BT-SIG), such as the standard defined in the Bluetooth Specification 4.2, Dec. 9, 2014, including its predecessors, revisions and progeny (the "Bluetooth Protocol"). Several embodiments are directed to the Low Energy (LE) form of the Bluetooth Protocol, which may be referred to as Bluetooth Low Energy (BLE).

Although techniques for certain embodiments are described with respect to the Bluetooth Protocol, it may be appreciated that the same or similar techniques may be applied to other wireless communications protocols as well. Embodiments are not limited in this context.

In general, network protocols may include definitions and requirements for network interfaces. For example, a network protocol may define a master interface and a slave interface and the way they interoperate. A device which operates with or as a master interface may be termed a master device, and a device which operates with or as a slave interface may be termed a slave device. The master device may control one or more slave devices, and once the master/slave relationship is established, the direction of control will always be from the master to the one or more slaves.

The Bluetooth Protocol uses a master/slave model. Bluetooth devices may form a structure called a piconet, in which there may be one master, and up to seven slaves. The master controls the parameters of the connection and communication between the master and each slave. The slaves do not connect or communicate directly with one another. However, pursuant to one of the recent major changes in the Bluetooth protocol, a single Bluetooth device may be both a master and a slave, so long as it operates in these different roles in different networks. Still, the slaves, in their role as slaves, cannot connect directly to each other.

Conventional techniques for forming a piconet using a master/slave model have significant disadvantages. For example, if one slave device wants to send information to another slave device, it may be that the only way to accomplish this is for the slave to send a message to the master requesting that a message be sent to the other slave device. This may at least double the amount of network traffic required compared to a slave device being able to send a message directly to another slave device. Moreover, it could cause significant increases in power consumption. It would be advantageous if the source slave device could indicate a destination device and have a message delivered either directly, with either no processing, or a only a minimal amount of processing, by other devices in the network. Technical advantages include, but are not limited to, bandwidth usage and power consumption. Other advantages are noted below.

Moreover, the conventional techniques described above may impose distance restrictions between devices connected by a piconet. That is, the maximum physical distance between a source and destination device may be limited by the wireless range between the two devices. For example, the maximum distance between a master and a slave may limit the potential size of piconet with a central master and slaves that cannot communicate with each other. Communication between devices that are located more than maximum distances from each other may not be possible using such a piconet structure. However, a significant technical advantage could be achieved if slave devices were able to be intermediate devices so that they could bridge that gap by relaying data.

Attempts to address these issues by a master that receives data from one slave at an application layer, and sends it to a second slave also at the application layer could create a significant communication and processing overload on the master which could cause, for example, degraded performance of the master, latency in communication between the source and destination devices, and limited communication ranges. Other challenges and limitations may be overcome by the subject matter and principles disclosed herein.

Embodiments attempt to solve these and other problems by implementing, among other features, a unique addressing scheme for a piconet. In one embodiment, for example, a network or system may comprise a set of devices including a first device, where the first device may include a logical connection manager. The logical connection manager is to manage connections with the set of devices, and may include addressing logic. The addressing logic may determine a network address in a set of network addresses for a corresponding set of devices. In one embodiment, for example, the addressing logic may determine a sequential current logical mesh network (LMN) address in a set of sequential LMN addresses corresponding to the set of devices. Furthermore, the logical connection manager may include a master interface and a slave interface. The master interface may connect to a slave interface of a second device within the set of devices, the second device having a sequentially next LMN address. The slave interface may connect to a master interface of a third device within the set of devices, the third device having a sequentially previous LMN address. Other embodiments are described and claimed.

Other embodiments include a network that is formed by devices that advertise to and scan for information from other devices in a set of devices. These devices may stop advertising and scanning after connecting to another device. Each device may accumulate network information about other devices in the set of devices, and pass this information to peer devices. The network may be operative after determining that forwarding information has been collected from all devices in a set of devices.

Embodiments provide significant technical advantages over conventional solutions. Some embodiments, for example, may provide technical advantages such as avoiding degraded performance of the master, which could occur if slave devices tried to communicate with each other by passing messages through their master. Other embodiments might provide technical advantages such as avoiding additional latency, which could occur in the above and other situations. A further technical advantage may be increasing the maximum effective distance between network devices. For example, a distant sensor can be connected to a sensor network by providing a backbone of intermediate devices according to the principles disclosed. Furthermore, some embodiments might enjoy all of the technical advantages described, in addition to others.

FIG. 1 illustrates a system 100 comprising a set of devices, including a device 110, device 120, and device 150. These devices are configurable to be in a logical mesh network. While FIG. 1 illustrates only three devices for purposes of clarity and understanding, it may be appreciated that the system 100 may comprise more or less devices as desired for a given implementation. For example, one embodiment may include devices 130, 140 (not shown). Embodiments are not limited to a particular number of devices for the system 100.

In one embodiment, each device includes a logical connection manager, a portion of which may be implemented in hardware or firmware. For example, device 110 includes logical connection manager 111, device 120 includes logical connection manager 121, and device 150 includes logical connection manager 151. The logical connection manager is for each device to manage logical connections with the set of devices within the system 100, which in this embodiment includes devices 110-150 as noted above.

Each device may further include, in the embodiment shown in FIG. 1, addressing logic. Device 110 includes addressing logic 112, device 120 includes addressing logic 122, and device 150 includes addressing logic 152.

The addressing logic may be generally arranged to determine a set of network addresses for the set of devices within the system 100. In general, a network address is an identifier for a device or network interface of a telecommunications network, such as the system 100. Network addresses are often designed to be unique across the system 100, although some networks allow for relative or local addresses that may not be unique. A network address may be used by a device or network interface to connect and route information to a particular device or network interface in the system 100. In one embodiment, for example, the network address may be for a peer device, such as between two or more of the devices 110, 120, 130, 140 and/or 150. In such cases, the network address may be used for peer-to-peer communications, forming a mesh configuration or logical mesh network.

In one embodiment, for example, the addressing logic may determine a sequential current logical mesh network address in a set of sequential LMN addresses corresponding to the set of devices. As used herein, the term "sequential" refers to an ordered set of network addresses in which repetitions are not allowed. By way of example, system 100 may use a set of sequential addresses that include a network address for each device in the system 100, including a first address, a last address, and three intermediate addresses. For example, device 110 has current LMN address 116, device 120 has current LMN address 126 and device 150 has current LMN address 156. Further, each sequential address, except the initial and last sequential address, will have a previous address and a next address. The first address will have only a current next address and no current previous address, while the last address will have only a current previous address and no current next address.

The sequential addresses correspond to the set of devices, so that corresponding to the initial address is the initial device (hereinafter "the initial device"), corresponding to the last address is the last device (hereinafter "the last device"), and corresponding to the intermediate addresses are intermediate devices (hereinafter "intermediate devices"). Similarly, the device corresponding to the "next address" of a device will be the device with the sequentially next address, and the device corresponding to the "previous address" of a device will be the device with the sequentially previous address.

Each device in the embodiment shown in FIG. 1 has a master interface and a slave interface. In some embodiments, the master interface and slave interface are interfaces that operate in accordance with the Bluetooth Protocol. In other embodiments, a device need not be in full or even partial compliance with the Bluetooth Protocol in order to operate in accordance with the principles set forth herein. The master and slave interfaces will be discussed in further detail below.

As shown in FIG. 1, device 110 has master interface 113 and slave interface 114, device 120 has master interface 123 and slave interface 124, and device 150 has master interface 153 and slave interface 154. When operating in a logical mesh network according to the principles of this disclosure, the master interface of a first device will be connected to the slave interface of the next device, and the slave interface of the first device will be connected to the master interface of the previous device. As noted above, the initial device will be connected by its master interface to the slave interface of the next device, but will not be connected by its slave interface to any other device in the set of devices. Similarly, the last device will be connected by its slave interface to the master interface of the previous device, but will not be connected by its slave interface to any other device in the set of devices.

By way of example, assume the system 100 forms a three device logical mesh network between devices 110, 120 and 150, where the device 110 is an initial device, the device 120 is an intermediate device, and the device 150 is a last device. To form a connection between the devices 110, 120, the master interface 113 of the device 110 connects to the slave interface 124 of the device 120. As the device 110 is the initial device, the slave interface 114 of the device 110 is not connected to any other devices in the system 100. To form a connection between the devices 120, 150, the master interface 123 of the device 120 connects to the slave interface 154 of the device 150. As the device 150 is the last device, the master interface 153 is not connected to any other devices in the system 100.

Figure 2:
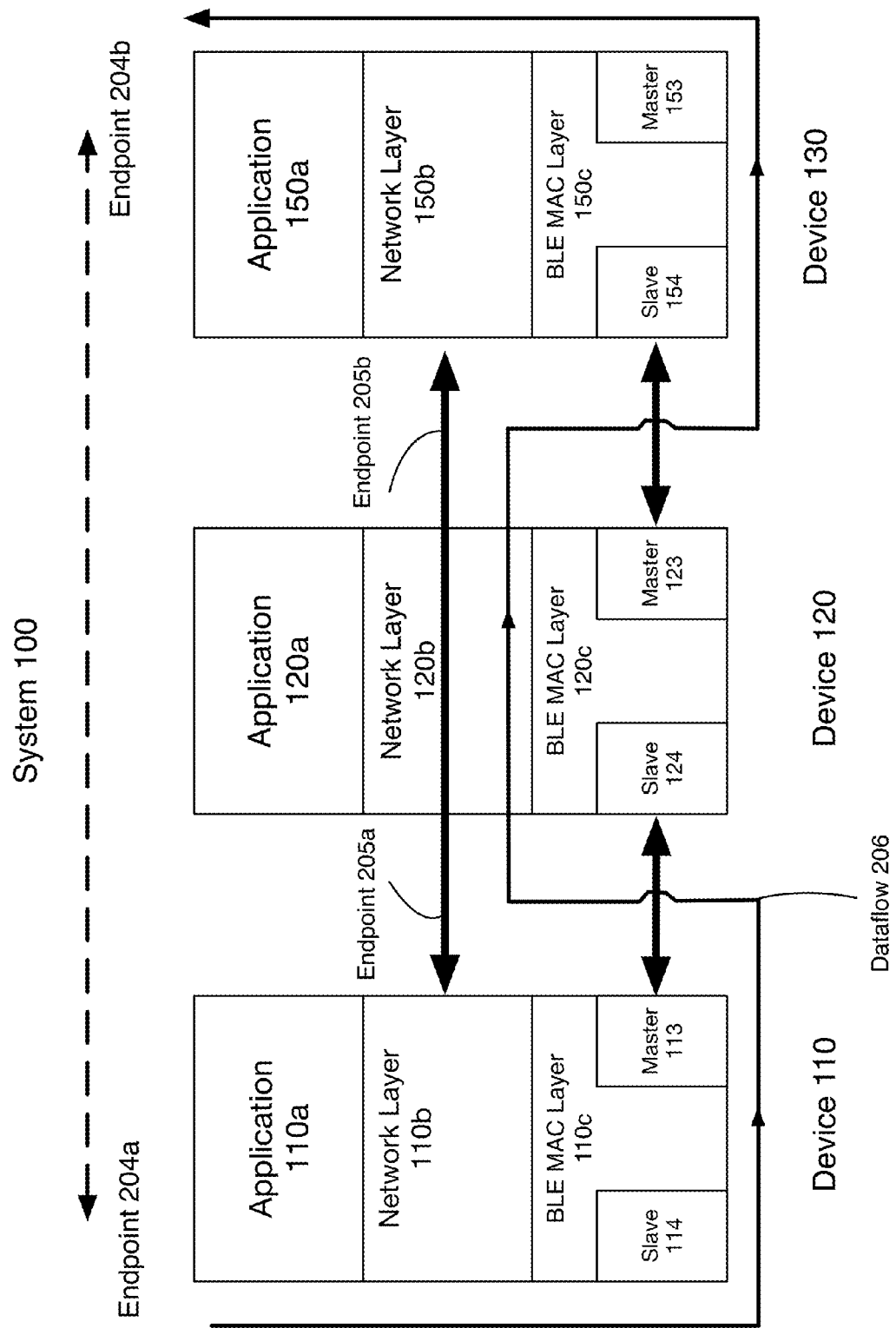
FIG. 2 depicts an embodiment of devices configured to be in a logical mesh network.

FIG. 2 illustrates additional aspects of system 100. In particular, FIG. 2 illustrates a protocol stack for each of the devices 110, 120 and 150, and a flow of information or data between the various protocol stacks and/or devices 110, 120 and 150. Communication between devices is typically implemented using multiple protocols, where each protocol implemented in software and/or hardware or firmware within a layer of a stack of protocols, often referred to as a "protocol stack." In one embodiment, a protocol stack may include an application layer, a network layer, and a Bluetooth media access control (MAC) layer.

As shown in FIG. 2, devices 110, 120 and 150 are connected, respectively, by their master and slave interfaces as described above. Endpoint 204a and endpoint 204b illustrate, respectively, the sending and receiving applications 110a and 150a. Endpoint 205a and endpoint 205b represent the endpoints of the network connection extending from the network layer 110b to the network layer 150b, through the network layer 120b, according to the principles set out in this disclosure and described below.

In an embodiment, dataflow 206 represents how data may flow in the LMN of system 100, comprising devices 110, 120, and 150. Dataflow 206 depicts an example of the flow of data from the application layer 110a of device 110 to the application layer 150a of device 150. Dataflow 206 is shown illustratively, beginning to the left of application 110a, moving down through network layer 110b to the MAC layer 110c and then to device 120. The data enters the device 120 at the MAC layer 120c, flows to the network layer 120b, and then back to the MAC layer 120c before being transferred to device 150. The data enters device 150 through the MAC layer 150c, is passed to the network layer 150b and then to application 150a. Applications 120a and 150a may be applications such as sensor data applications, instant messaging applications, notification applications, image sharing applications, or any other applications that may use network services. In this embodiment, application 110a initiates the sending of data from device 110 to application 150a of device 150. Dataflow 206 represents the flow of that data in the LMN of system 100.

FIG. 3 illustrates one example of a logical connection manager 121 of device 120 shown in FIG. 1. In the dataflow 206 described above in connection with FIG. 2, device 120 is an intermediate device. In this example, logical connection manager 121 manager includes current LMN address 126 and packet processing logic 125. Current LMN address 126 is one of a set of sequential LMN addresses and may be stored in any of a variety of storage media, which will be described in more detail below. Logical connection manager 121 may determine the current LMN address 126 according to a method described below in connection with further embodiments.

Packet processing logic 125, part of logical connection manager 121 may be implemented in whole or in part in hardware or firmware, or in whole or in part in software. In the embodiment shown in FIG. 3, packet processing logic 125 may be operative to act upon a received network packet 301. For example, FIG. 3 may depict an aspect of the operation of packet processing logic 125 in a portion of the dataflow 206 described above with reference to FIG. 2. In particular, during operation of a logical mesh network of a set of devices such as devices 110-150 shown in FIG. 2, an application 110a in device 110 may send a network packet 301 to an application 150a in device 150. On route to device 150, the network packet will be received by intermediate device 120, as shown in FIG. 3. After device 120 receives network packet 301, packet processing logic 125 may act upon network packet 301 to determine its network destination address 302. As shown in FIG. 3, the network destination address 302 may be contained within received network packet 301. Embodiments illustrating the operation of packet processing logic on a received packet are further described below.

Figure 4B:
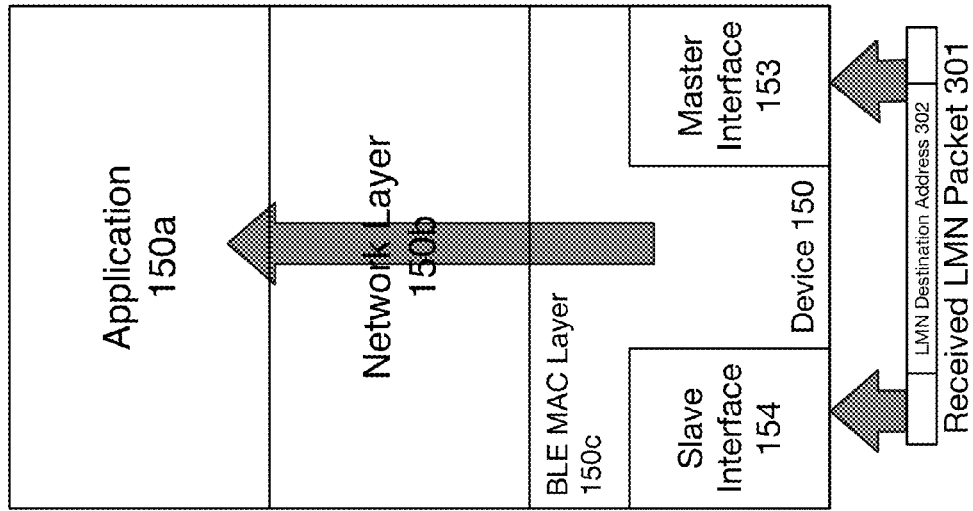
FIG. 4B depicts an embodiment of an aspect of network traffic flow in a device.
Figure 4A:
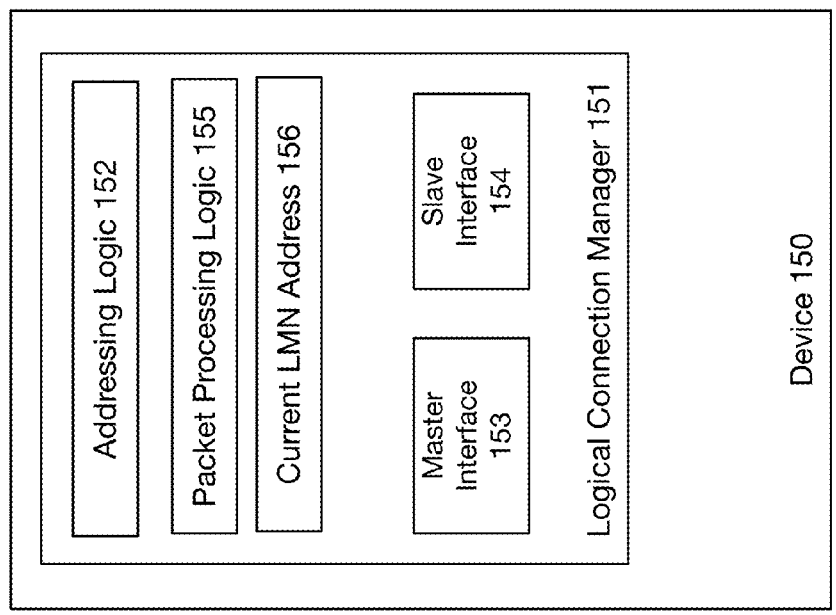
FIG. 4A depicts an embodiment of an aspect of network traffic flow in a device.

FIGS. 4A and 4B illustrate an exemplary operating environment to further describe the dataflow 206 of FIG. 2. FIGS. 4A and 4B illustrate two examples of the flow of network packet 301 when the network packet destination address 302 is the same as the current LMN address 156 of device 150. FIG. 4A is a block diagram of device 140 and FIG. 4B shows the network protocol stack of device 140. In some embodiments, logical connection manager 151 may be implemented in network layer 150b.

In the first example, the received network packet 301 is received through the slave interface 154 of device 150. In the second example, the received network packet is received through the master interface 153 of device 150. In both examples, the received network packet may next flow to logical connection manager 151, and, in particular, to packet processing logic 155. Packet processing logic 155, as described above, may determine destination address 302 of the received network packet 301. In the examples shown in FIG. 4, the destination address of the received network packet 301 is the same as the current LMN address 156 of device 150. As discussed above, in the context of networking, the destination address of a packet may indicate the device to which the packet is intended to be sent. For example, the packet may be sensor data or a portion of sensor data being sent to device 150. This is merely an example and not meant to be limiting. There are a myriad of networking applications and many more are being created everyday, and any of these may be used in the context of this disclosure. Packet processing logic 155 in the network layer may pass the received network packet to the application layer 150a of device 150 because the network packet is addressed to device 150. In various embodiments, the availability of the received network packet 301 at the network layer 150*b* enables the packet to be processed according to the intended application 150*a* and the configuration of device 150.

FIGS. 5A and 5B illustrate an exemplary operating environment to still further describe the dataflow 206 of FIG. 2. FIGS. 5A and 5B show examples of the flow of a received network packet 301 when network packet destination address 302 is different from the current LMN address of device 120. FIG. 5A is a block diagram of device 120 and FIG. 5B shows the network protocol stack of device 120. In one example, the received network packet 301 is received through slave interface 124 of device 120, and in another example, it is received through master interface 123. In both examples, received packet 301 may flow to logical connection manager 121, and in particular, packet processing logic 125. In some embodiments, logical connection manager 121 may be implemented in 120*b*. Packet processing logic 125, as described above, may determine the destination address of received network packet 301. As previously mentioned, for the examples depicted in FIGS. 5A and 5B, the destination address 302 of received network packet 301 is different from the current LMN address of device 126. This may indicate that the network packet is meant to be received by a different device in the set of devices comprising the logical mesh network, and that device 120 is an intermediate device meant to forward the received packet towards the device corresponding to the destination address of the received packet. In this situation, packet processing logic may forward the received network packet 301. Packet processing logic 125 may forward received network packet 301 through either slave interface 124 or master interface 123. The forwarding process will be described in more detail below.

Figure 6:
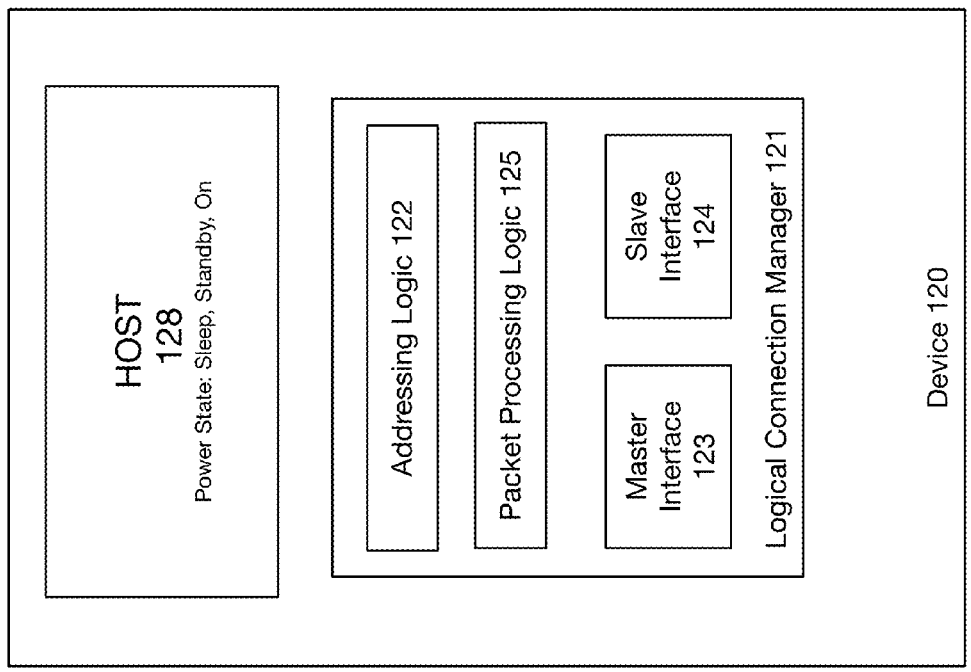
FIG. 6 depicts an embodiment of a device with a host.

FIG. 6 illustrates an embodiment in which device 120 has a host 128. The term "host" as used herein refers to the host portion of the device, at least a portion of which may be implemented in hardware or firmware. In the context of wireless networking, the term host may refer to the host layers of the protocol stack, which may include all the layers above the MAC layer. For example, in the context of the Bluetooth Protocol and BLE, the Bluetooth host may to all of the protocol layers above the host-controller interface layer. As such, the host may include applications and portions of the operating system of the device including power control. In addition to an on-state and an off-state, network devices may include other power states such as standby, sleep, or low-power. The control of these power states may be used to control the power consumption and efficiency of devices. The host may be in a lowered power state while the host-controller interface layer and the layers below remains operative, thereby saving power but still being operative to receive and process network traffic by the latter.

FIG. 6 depicts device 120 as including a host with three power states, sleep, standby, and on. When the host is in sleep or standby mode, less power is consumed than when it is on. According to the principles set forth in this disclosure, a network packet may be received, processed, and forwarded by a device in a set of devices comprising a logical mesh network, without requiring the host to be in the on-state, or to undergo any power changes. That is, the processing required to receive and forward a network packet by the packet processing logic 125 and the logical connection manager 121 may occur without causing the host to change power state. These embodiments can provide power savings by enabling processing of received network packets without having to change the power state of the host 128. When there are many network packets and many devices, the power savings may be increased.

As described, host 118 may have various power states such as sleep, standby, or on. It is worthy to note that there may be other host power states other than those mentioned without departing from the principles of this disclosure, for example hibernate or deep sleep. That is, the network packet is received, its destination address is determined to be different from current LMN address of device 610, the received packet is forwarded to another device in the set of devices comprising a logical mesh network, without causing a change in the power state of host 128, whatever the various power states of host 128 may be.

Figure 7:
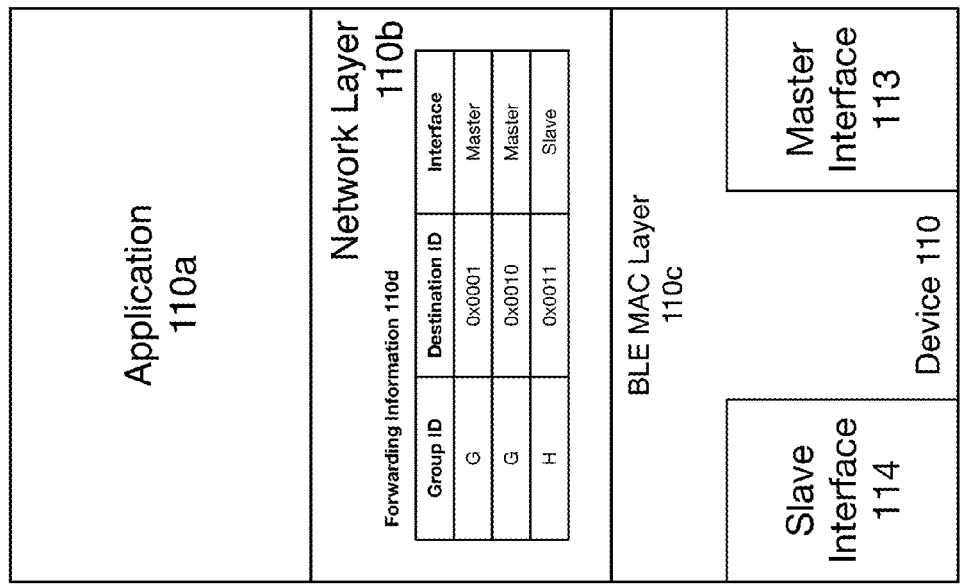
FIG. 7 depicts an embodiment of forwarding information in a device.

FIG. 7 illustrates an example of forwarding information 110*d* for device 110. Forwarding information is used by the device to determine which interface to use to forward a received network packet to a device with a particular destination address other than the current LMN address of device 110. Generally, forwarding information comprises a set of entries, where each entry corresponds to an LMN address in the set of LMN addresses that correspond to the set of devices comprising a logical mesh network. Forwarding information may be stored in any variety of storage media, as will be discussed in detail below.

In some embodiments, a device such as device 110 may belong to more than one logical mesh network. In these embodiments, forwarding information 110*d* for each entry will include a network identifier, also known as a group identifier. For example, the first entry or row in forwarding information 110*d* has group identifier G and the third entry or row has group identifier H, indicating that device 110 is a member of two logical mesh networks, one with group identifier G, the other with group identifier H. This is not limiting in any way; a device may be a member of one or more logical mesh networks within the principles of this disclosure.

Each entry in forwarding information 110*d* comprises, in addition to the network or group identifier, and a sequential LMN address of another device in the set of devices comprising that LMN, identification of which interface, the master interface or the slave interface, should be used to forward a packet with destination address of that entry. For example, the first row of forwarding information 110*d* indicates that in network G, a received packet with destination address 0x0001 should be forwarded through the master interface 113 of device 110. Similarly, the third row of forwarding information 110*d* indicates that in network H, a received packet with destination address 0x0011 should be forwarded through slave interface 114.

Figure 8:
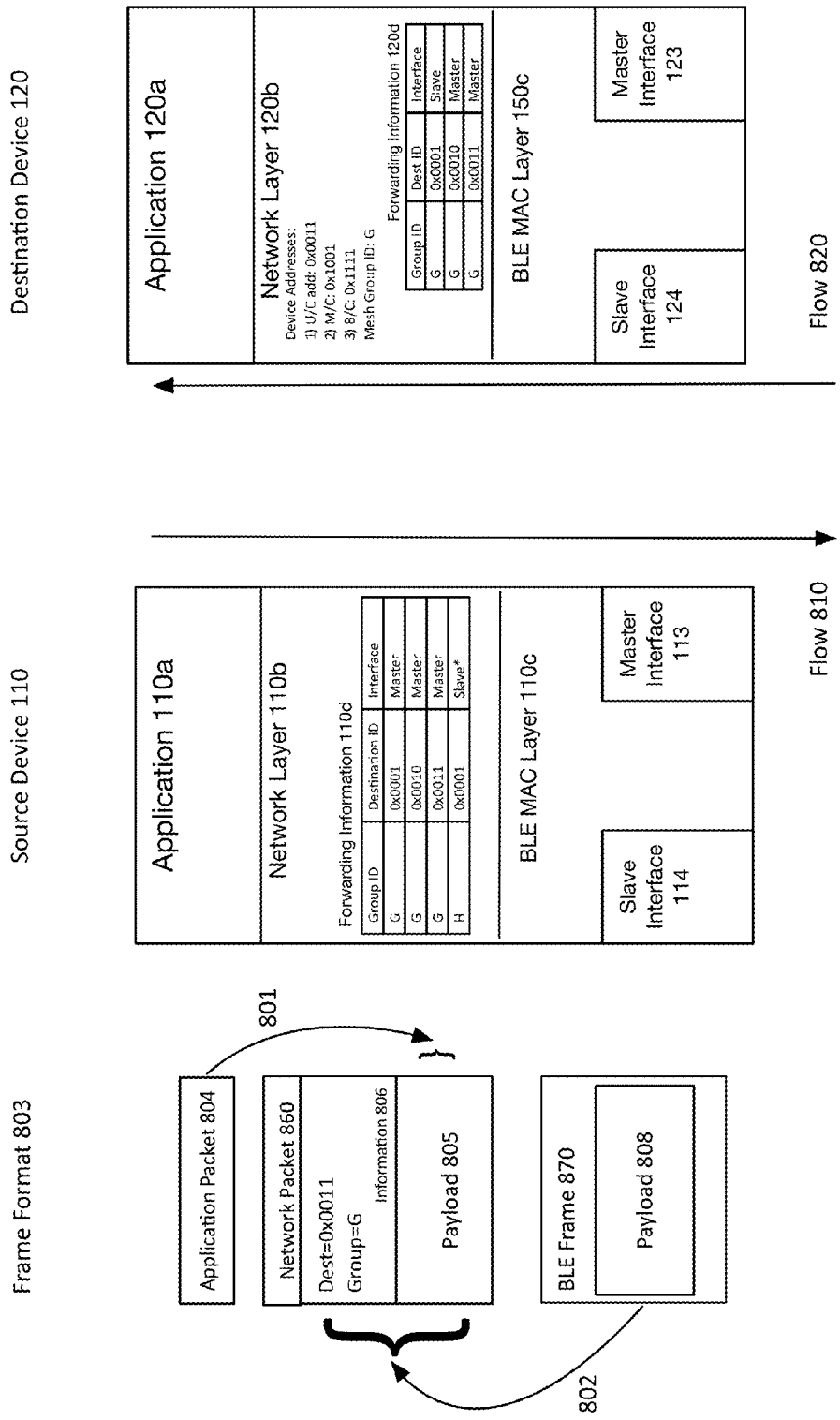
FIG. 8 depicts an embodiment of an aspect of network traffic flow in a source and destination device.

FIG. 8 depicts an example of a packet flow 810 through source device 110 and packet flow 820 through destination device 120. The flows 810 and 820 are depicted with the protocol layers of devices 110 and 120, and the frame format 803 at corresponding protocol layers. It is worthy to note that in the context of this disclosure, the terms "frame" and "packet" are used interchangeably.

Frame format 803, as shown on the left side of the diagram in FIG. 8, has three parts. The first part is application layer packet 804. Application layer packet 804 is a packet formed by an application running on a device such as device 110 or 120, such as a sensor data application, or any other application that uses network services. An application may cause a packet to be formed to transfer information to another application running on a different device. For example, application 110a running on device 110 may form packet 804 to transfer information to application 110a running on device 110.

After packet 804 is formed at the application layer to be transferred to another device, it may be passed to a network layer. For example, packet 804 is passed from application layer 810a to network layer 810b. At network layer 810b, the information in packet 804 may be encapsulated as payload 805 as indicated by arrow 801, and then preceded by information 806 which comprises the LMN destination address and identifier. The information 806 in FIG. 8 is 0x0011 for the LMN destination address and G for the network or group identifier. Examples for information 806 may include a header or header information.

The packet 804 formed at application layer will next pass to the MAC layer 110c and be encapsulated to become MAC frame 807. As indicated by arrow 802, the payload of the MAC layer frame 807 will be formed from the combination of payload 805 and information 806 of network packet 860. For the example depicted in FIG. 8, the MAC layer frame 870 will be formed according to the Bluetooth Specification to prepare for transmission by a Bluetooth radio (not shown). Additional information included in the encapsulated frame is derived from forwarding information 110d in device 110. For example, which of the master interface 113 or slave interface 114 to use to forward the MAC frame 807 is derived from the forwarding information 110d. For example, using information 806 as an index into forwarding information 110d, the third row is indicated, which identifies the master interface. Thus, information indicating master interface 113 will be included in the encapsulated packet.

After being transmitted to and received by appropriate intermediate devices, MAC frame 870 will be received by device 150. As discussed above, the destination address of packet 870 will be determined to be the same as the current LMN address of device 150, and the packet will be passed from MAC layer 850c up the protocol stack of device 150 to network layer 150b, and then to application layer 150a. Forwarding information 150b of device 150 is not necessary for passing a received packet up the protocol stack of the destination device.

Figure 9:
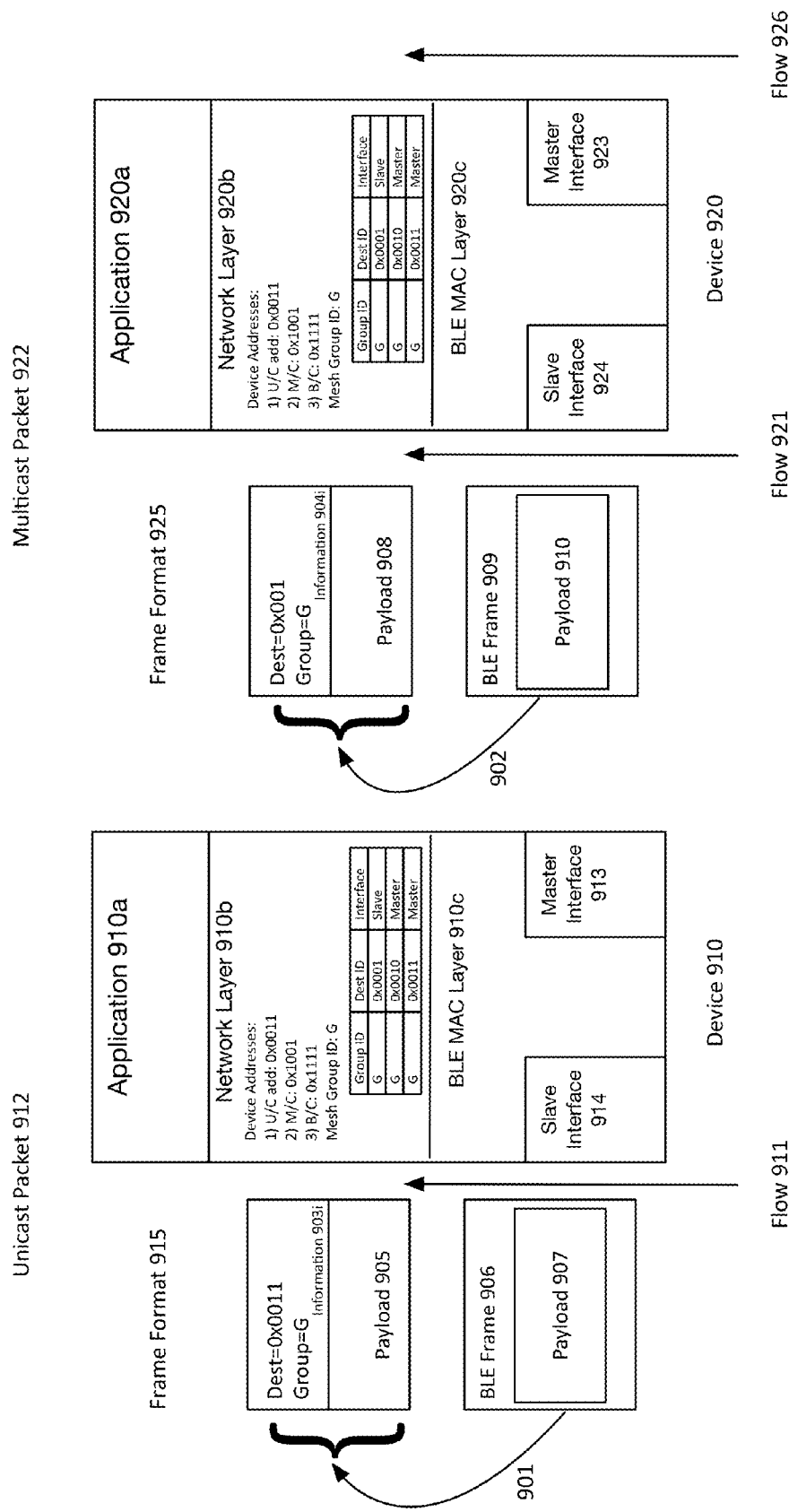
FIG. 9 depicts an embodiment of aspects of multicast and broadcast traffic flows.

FIG. 9 depicts example packet flows 911 and 921 through intermediate devices 910 and 920. Packet flow 911 is illustrated with unicast packet 912, and packet flow 910 is illustrated with multicast packet 922. Each flow is depicted with the protocol layers of the corresponding devices, and a portion of the frame format 915 for packet 912 and a portion of frame format 925 for packet 922 are illustrated at corresponding protocol layers. As stated above, in the context of this disclosure, the terms "frame" and "packet" are used interchangeably.

In this embodiment, the flow of unicast packet 912 through intermediate device 910 proceeds as follows. Device 910 receives Bluetooth Low Energy (BLE) frame 906 including payload 907. As shown by arrow 901, payload 907 is passed to network layer 910b where it is unpacked into information 903i and payload 905. Information 903i indicates that the destination LMN address is determined to be 0x0011 and the LMN group identifier to be G. Based on the forwarding information in network layer 910b, master interface 913 is indicated to be the egress interface for forwarding. The network layer 910b will pass payload 905 and information back to BLE layer 910c for encapsulation as a BLE layer frame to be transmitted over the physical network through master interface 913.

The flow of multicast packet 922 through intermediate device 922 proceeds as follows. In this example, device 920 receives BLE frame 909 including payload 910. As shown by arrow 902, the payload 910 is passed to the network layer 920b where the MAC payload 910 is parsed into information 904i and payload 908. Information 904i indicates that LMN destination address of packet 922 is determined to be multicast address 0x1001 and the LMN group identifier to be G. Based on the forwarding information in network layer 920b, and the device address information, it may be determined that packet 922 is a multicast packet with a LMN destination multicast address 0x1001. Multicast address is shared at least by intermediate device 920 that has received the packet in addition to other devices in the set of devices comprising the LMN. This is indicated by the second row of the forwarding information indicating that a packet with destination address 0x1001 in network G is to be forwarded through master interface 923 of intermediate device 920, as shown by flow 926.

Figure 10:
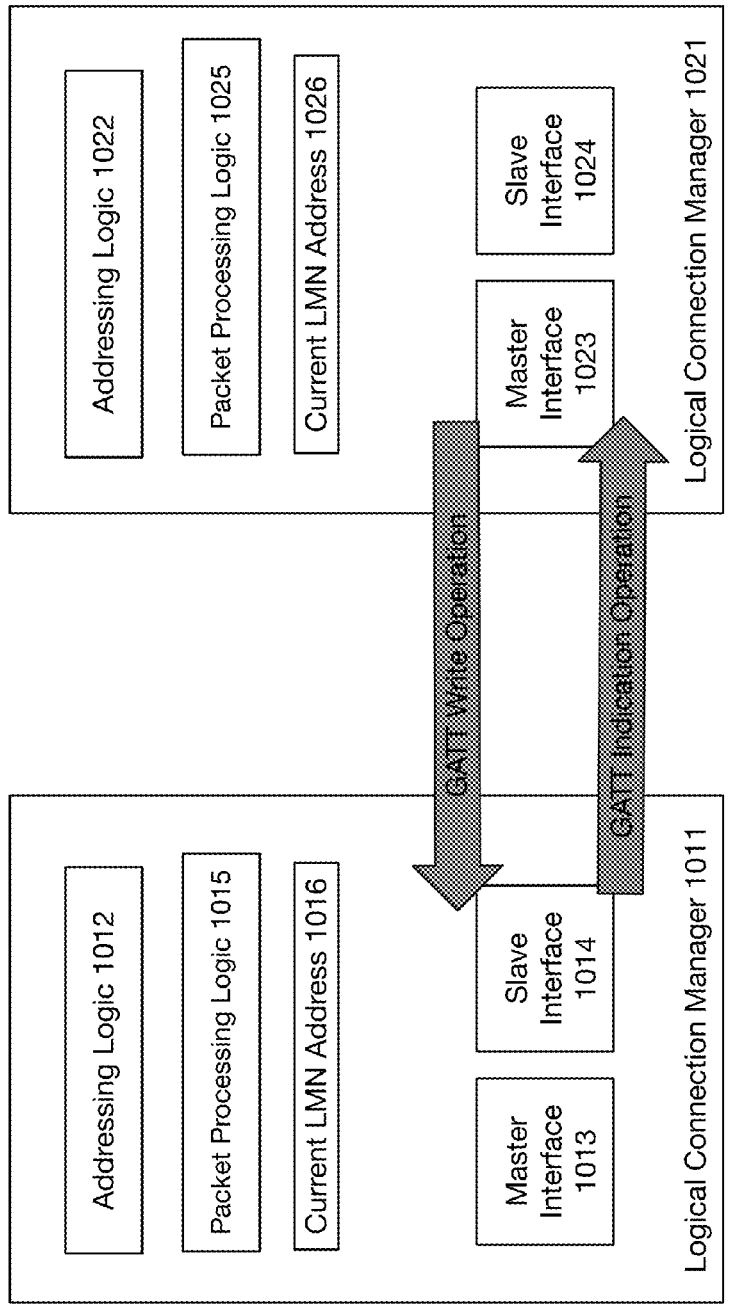
FIG. 10 depicts an embodiment of devices transferring information.

FIG. 10 depicts an embodiment which illustrates example BLE messages to exchange information between adjacent devices in a logical mesh network. For example, if it is determined that device 120 is to send a network message over slave interface 124 to master interface 133 of device 130, slave interface 124 may send an BLE indication or notification message to master interface 123. On the other hand, if it is determined to send a message from master interface 123 to slave interface 124, master interface 123 may use a BLE write operation. As mentioned earlier, BLE messages are used in some embodiments according to the principles disclosed herein, but this is not limiting in any way. Other wireless network protocols may be used within the spirit and principles of the subject matter of this disclosure.

Figure 11:
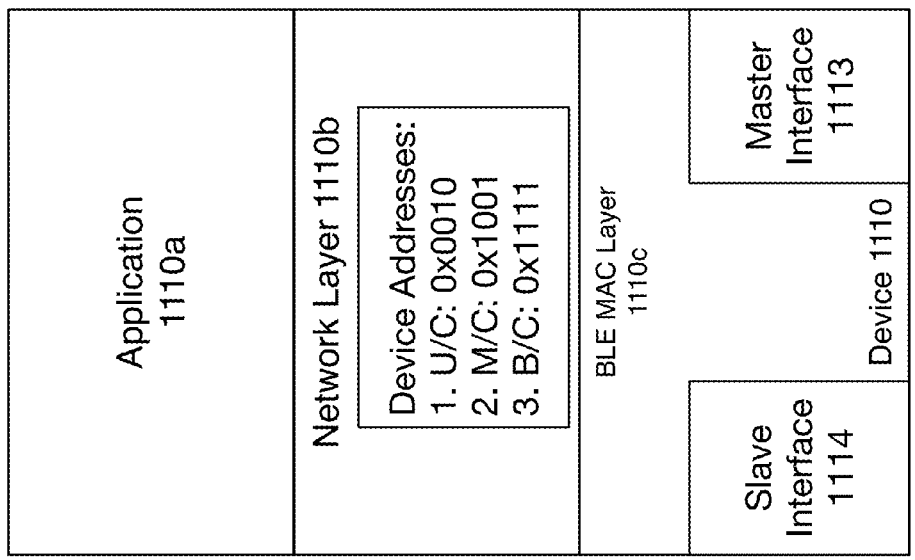
FIG. 11 depicts an embodiment of a device with a unicast, multicast and broadcast address.

FIG. 11 shows an alternate embodiment of device 110 of FIG. 1. In the alternate embodiment shown in FIG. 9, device 110 has three network addresses—each of a different kind—rather than one network address as in the embodiment shown in FIG. 1. The three kinds of network addresses are a unicast network address or unicast address, a multicast network address or multicast address, and a broadcast network address, or broadcast address. A unicast address is a network address that belongs to one device only. The embodiments described above may be understood in terms of the LMN addresses being a unicast addresses. A broadcast network address is an address shared by all devices in a particular network. For example, in system 100 of FIG. 1, a broadcast address would be shared by, and the same for each of the three comprising devices. When a network message or packet is sent with a broadcast address, it goes to each device with that address, i.e. all the devices in that network. A multicast address corresponds to a group of devices in a network. A group of devices or a group of addresses may be selected and defined as a multicast group. Each device which gets assigned that multicast address will then receive network messages or packets addressed to that multicast address. Other devices that comprise the network but do not include that multicast network address may still receive messages or packets at the MAC and network layers, but will not receive those packets at the application layer. There may be one or several, or no, multicast groups within any particular network. In FIG. 9, device 110 is depicted as having unicast address 0x0010, multicast address 0x1001 and broadcast address 0x1111.

Figure 12:
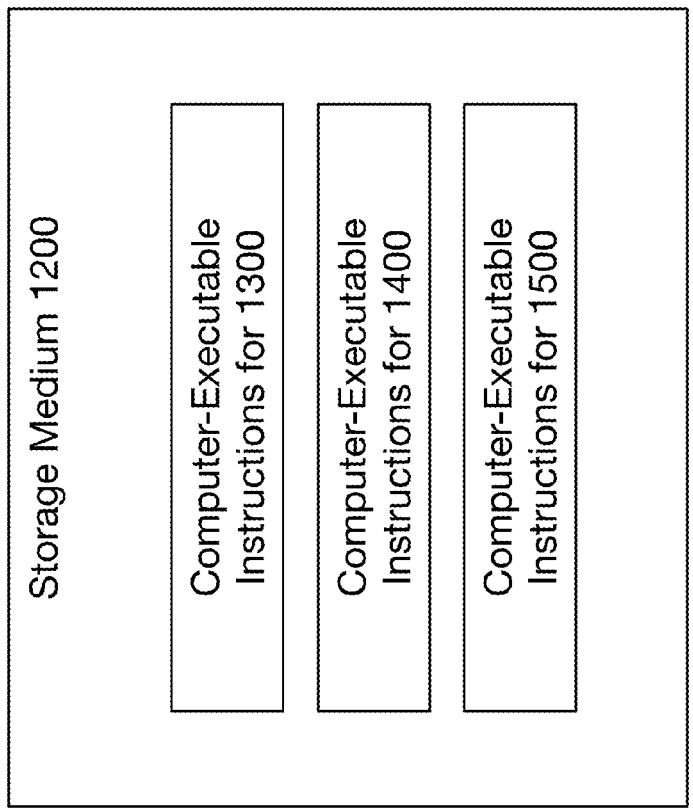
FIG. 12 depicts a computer-readable medium.

FIG. 12 illustrates an embodiment of a storage medium 1100. Storage medium 1100 may comprise any non-transitory computer-readable storage medium or machine-readable storage medium, such as an optical, magnetic or semiconductor storage medium. In various embodiments, storage medium 1100 may comprise an article of manufacture. In some embodiments, storage medium 1100 may store computer-executable instructions, such as computer-executable instructions to implement one or more of logic flow 1300 of FIG. 13, logic flow 1400 of FIG. 14, and logic flows 1500, 1510 and 1520 of FIGS. 15A and 15B. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware or firmware element, a software element executed by a processor, or any combination thereof. The embodiments are not limited in this context.

Figure 13:
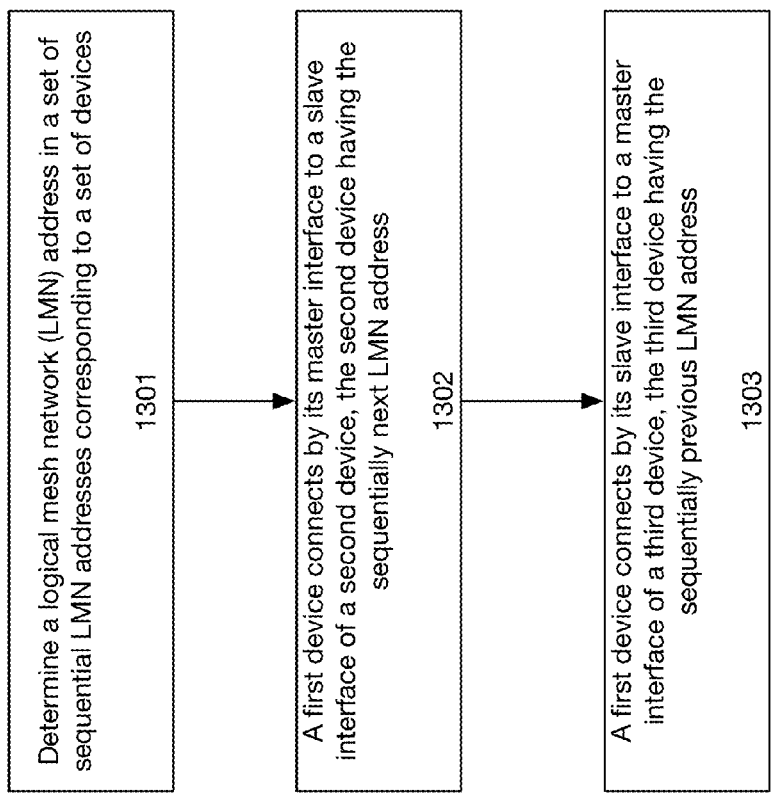
FIG. 13 depicts an embodiment of a first logic flow.

FIG. 13 illustrates an example a logic flow that may be representative of some embodiments. More particularly, logic flow 1300 may be representative of operations that may be performed in various embodiments by devices such as device 110, 120, and 150 of system 100 comprising a LMN as shown in FIG. 1. As shown in FIG. 13 at 1301, a logical mesh network (LMN) address in a set of sequential LMN addresses, corresponding to a set of devices, may be determined for a device in the set of devices.

For example, in FIG. 3, device 110 has current LMN address 116, device 120 has current LMN address 126, and device 150 has current LMN address 156. Current LMN addresses 116, 126, and 156 are sequential and correspond to the set of devices 110, 120 and 150.

At 1302, a first device connects by its master interface to a slave interface of a second device where the second device has the sequentially next LMN address. For example, in FIG. 1 device 120 connects by its master interface 123 to the slave interface 154 of device 150, which has the sequentially next LMN address.

At 1303, a first device connects by its slave interface to a master interface of a third device where third device has the sequentially previous LMN address. For example, in FIG. 1, device 120 connects by its slave interface 124 to the master interface 113 of device 110, which has a sequentially previous LMN address.

Figure 14:
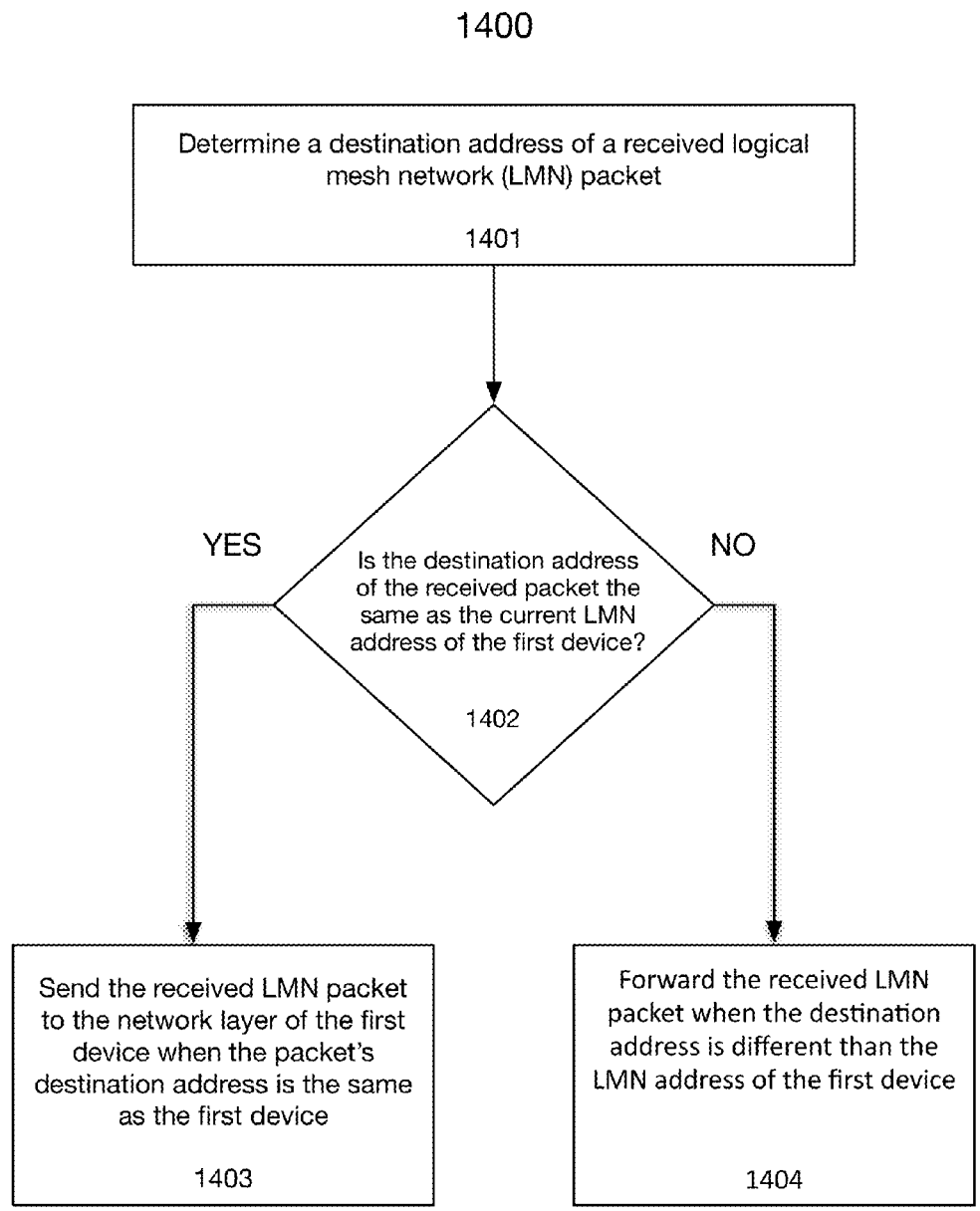
FIG. 14 depicts an embodiment of a second logic flow.

FIG. 14 illustrates an example a logic flow that may be representative of some embodiments. More particularly, logic flow 1400 may be representative of operations that may be performed in various embodiments by a device in a set of devices comprising an LMN such as device 120 or device 150 in FIGS. 3, 4A-4B and 5A-5B. As shown in FIG. 14 at 1401, a LMN packet is received by a device which determines the LMN destination address of the received LMN packet. For example, in FIG. 3, LMN packet 301 is received by device 120 and packet processing logic 115 determines the LMN destination address of received packet 301.

At 1402, the receiving device determines whether the destination address of the received packet the same as the current LMN address of the device. For example, in FIGS. 4A and 5A, packet processing logic 125 determines whether the destination address 302 of received packet 301 is the same as current LMN address 126 of device 120. If it is determined that the destination address 301 is the same as current LMN address 126, then the flow moves to 1403. If it is determined that the destination address 301 is different from the current LMN address 126, then the flow moves to 1404.

At 1403, the received LMN packet is passed to the network layer of the receiving device because the packet's destination address is the same as the first device. For example, in FIG. 4B, the received LMN packet 301 is passed to the network layer 120b of device 120.

At 1404, the received LMN packet is forwarded because the packet's destination address is different from the receiving devices network address. For example, in FIG. 5B, the received LMN packet 301 is forwarded through either the slave interface 124 or the master interface 123 of device 120.

Figure 15A:
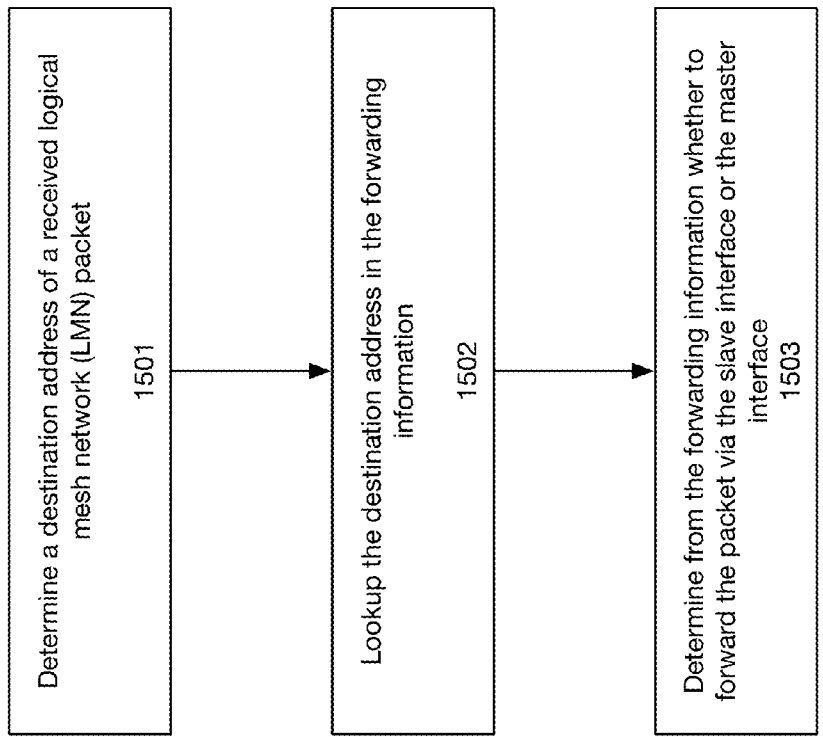
FIG. 15A depicts an embodiment of a third logic flow.

FIG. 15A illustrates an example a logic flow that may be representative of some embodiments. More particularly, logic flow 1500 may be representative of operations that may be performed in various embodiments by device 120 of FIG. 3 and device 110 of FIG. 7. As shown in FIG. 15A at 1501, a device determines the destination address of a received network packet. For example, in FIG. 3, device 120 determines the destination address 302 of received packet 301.

At 1502, the destination address is looked up in the comprising entries of the forwarding information. For example, as shown in FIG. 7, forwarding information 110d includes rows of entries for other devices in the set of devices comprising a LMN. Each entry is indexed by the LMN address corresponding to one of the devices in the set of devices comprising the LMN.

At 1503, the entry in the forwarding information indexed with the destination address of the received network packet determines which interface to use to forward the received network packet 302. For example, in FIG. 7, a packet 301 with LMN destination address 0x0010 indicates the master interface 123.

Figure 15B:
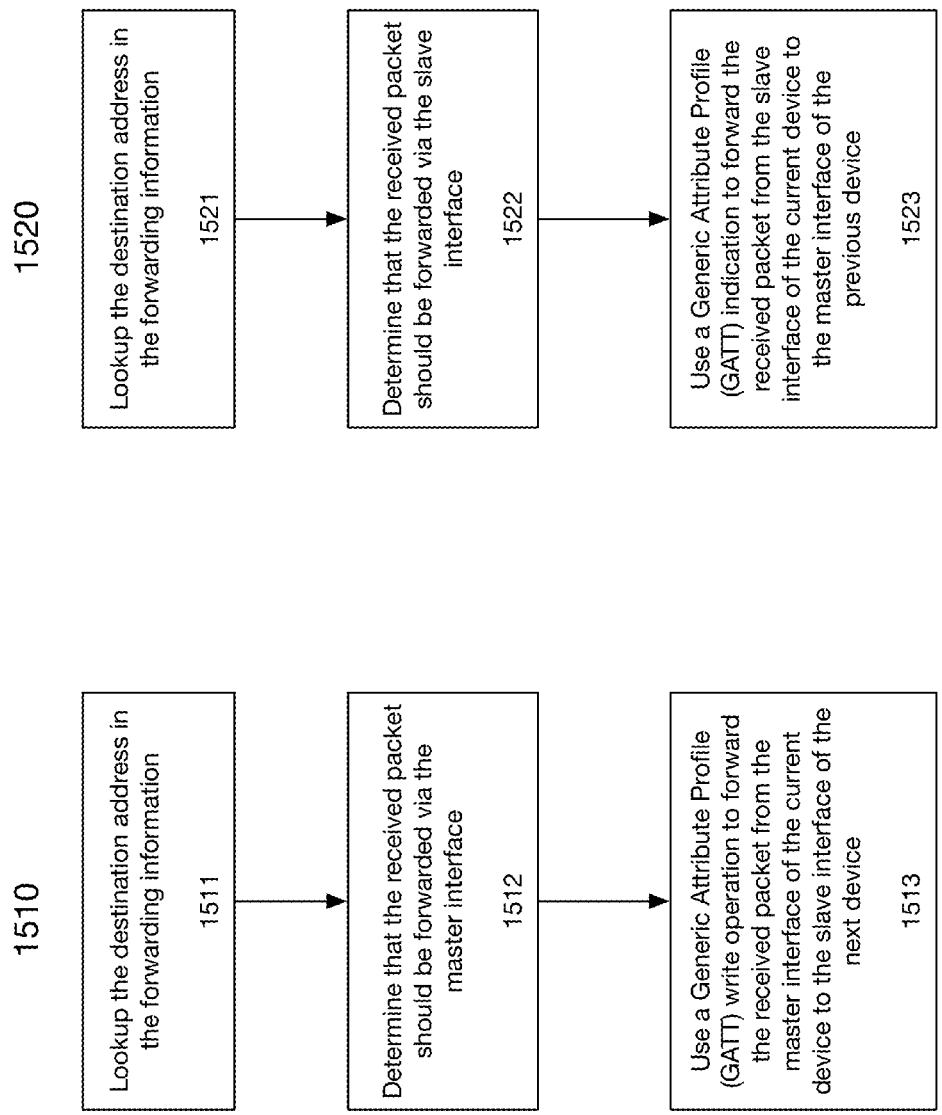
FIG. 15B depicts an embodiment of a fourth logic flow.

FIG. 15B illustrates two examples of logic flows 1510 and 1520 that may be representative of some embodiments. More particularly, logic flows 1510 and 1520 may be representative of operations that may be performed in various embodiments by devices such as device 110 of FIG. 7 and devices 1020 and 1030 of FIG. 10. As shown in FIG. 15B at 1511, the destination address of a received packet is looked up in a forwarding information. For example, in FIG. 7, the destination address is looked up in forwarding information 110d.

At 1512, the forwarding information indicates that the received packet should be forwarded via the master interface. For example, in FIG. 7, device 110 may determine by consulting the forwarding information 110d that the received packet should be forwarded over the slave interface 114. At 1513, the device 130 uses a Generic Attribute Profile (GATT) indication or notification to forward the received packet from the slave interface of the current device to the master interface of the previous device. For example, in FIG. 10, device 1010 uses a GATT indication to forward the received packet from slave interface 1014 to the master interface 1023 of the device 1020.

As shown in FIG. 15B at 1521, the destination address of a received packet is looked up in a forwarding information. For example, in FIG. 7, the destination address is looked up in forwarding information 110d. At 1522, the forwarding information indicates that the received packet should be forwarded via the slave interface. For example, in FIG. 7, device 110 may determine that the received packet should be forwarded over the master interface 113. At 1523, a device uses a Generic Attribute Profile (GATT) write operation to forward the received packet from the master interface of the current device to the slave interface of the previous device. For example, in FIG. 10, device 1020 uses a GATT write operation to forward the received packet from master interface 1023 to the slave interface 1014 of the device 1010.

Figure 16:
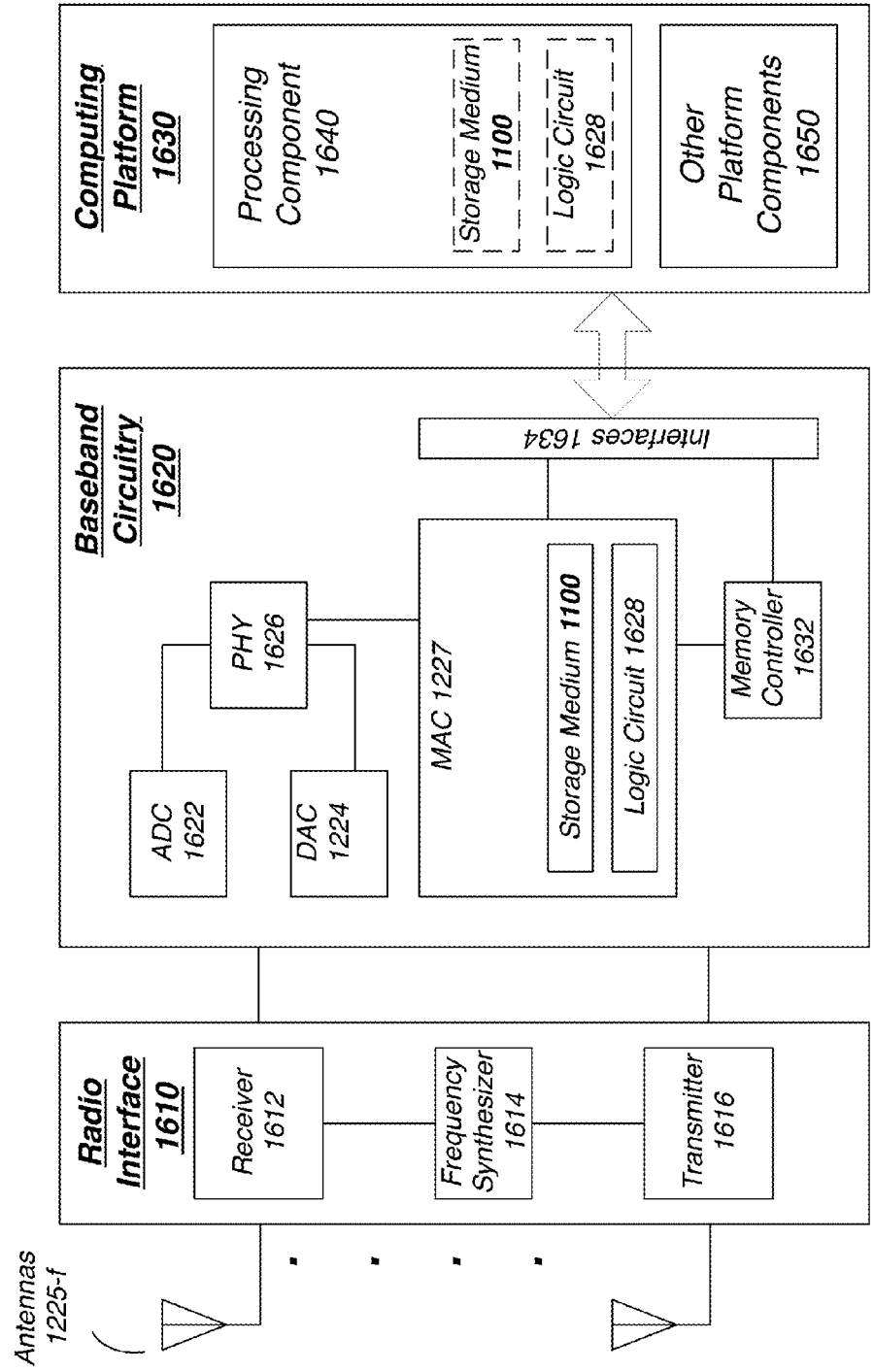
FIG. 16 an embodiment of a device.

FIG. 16 illustrates an embodiment of a communications device 1600 that may implement one or more of devices 110-150 of FIGS. 1-3, logic flow 1300 of FIG. 13, logic flow 1400 of FIG. 14, logic flows 1500, 1510 and 1520 of FIGS. 15A and 15B, and logic flow 1600 of FIG. 16. In various embodiments, device 1600 may comprise a logic circuit 1628. The logic circuit 1628 may include physical circuits to perform operations described for one or more of devices 110-150 of FIGS. 1-3, logic flow 1300 of FIG. 13, logic flow 1400 of FIG. 14, logic flows 1500, 1510 and 1520 of FIGS. 15A and 15B, and logic flow 1600 of FIG. 16, for example. As shown in FIG. 16, device 1600 may include a radio interface 1610, baseband circuitry 1620, and computing platform 1630, although the embodiments are not limited to this configuration.

The device 1600 may implement some or all of the structure and/or operations for one or more of devices 110-150 of FIGS. 1-3, logic flow 1300 of FIG. 13, logic flow 1400 of FIG. 14, logic flows 1500, 1510 and 1520 of FIGS. 15A and 15B, and logic flow 1600 of FIG. 16, and logic circuit 1628 in a single computing entity, such as entirely within a single device. Alternatively, the device 1600 may distribute portions of the structure and/or operations for one or more of one or more of devices 110-150 of FIGS. 1-3, logic flow 1300 of FIG. 13, logic flow 1400 of FIG. 14, logic flows 1500, 1510 and 1520 of FIGS. 15A and 15B, and logic flow 1600 of FIG. 16 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1610 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1610 may include, for example, a receiver 1612, a frequency synthesizer 1614, and/or a transmitter 1616. Radio interface 1610 may include bias controls, a crystal oscillator and/or one or more antennas 1618-f. In another embodiment, radio interface 1610 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1620 may communicate with radio interface 1610 to process receive and/or transmit signals and may include, for example, a mixer for down-converting received RF signals, an analog-to-digital converter 1622 for converting analog signals to digital form, a digital-to-analog converter 1624 for converting digital signals to analog form, and a mixer for up-converting signals for transmission. Further, baseband circuitry 1620 may include a baseband or physical layer (PHY) processing circuit 1626 for PHY link layer processing of respective receive/transmit signals. Baseband circuitry 1620 may include, for example, a medium access control (MAC) processing circuit 1627 for MAC/data link layer processing. Baseband circuitry 1620 may include a memory controller 1232 for communicating with MAC processing circuit 1627 and/or a computing platform 1630, for example, via one or more interfaces 1634.

In some embodiments, PHY processing circuit 1626 may include a frame construction and/or detection module, in combination with additional circuitry such as a buffer memory, to construct and/or deconstruct communication frames. Alternatively, or in addition, MAC processing circuit 1627 may share processing for certain of these functions or perform these processes independent of PHY processing circuit 1626. In some embodiments, MAC and PHY processing may be integrated into a single circuit.

The computing platform 1630 may provide computing functionality for the device 1600. As shown, the computing platform 1630 may include a processing component 1640. In addition to, or alternatively of, the baseband circuitry 1620, the device 1600 may execute processing operations or logic for one or more of devices 110-150 of FIGS. 1-3, logic flow 1300 of FIG. 13, logic flow 1400 of FIG. 14, logic flows 1500, 1510 and 1520 of FIGS. 15A and 15B, and logic flow 1600 of FIG. 16, using the processing component 1240. The processing component 1640 (and/or PHY 1626 and/or MAC 1627) may comprise various hardware or firmware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware or firmware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1630 may further include other platform components 1650. Other platform components 1650 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1600 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1600 described herein, may be included or omitted in various embodiments of device 1600, as suitably desired.

Embodiments of device 1600 may be implemented using single input single output (SISO) architectures. However, certain implementations may include multiple antennas (e.g., antennas 1225-f) for transmission and/or reception using adaptive antenna techniques for beamforming or spatial division multiple access (SDMA) and/or using MIMO communication techniques.

The components and features of device 1600 may be implemented using any combination of discrete circuitry, application specific integrated circuits (ASICs), logic gates and/or single chip architectures. Further, the features of device 1600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1600 shown in the block diagram of FIG. 16 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 17:
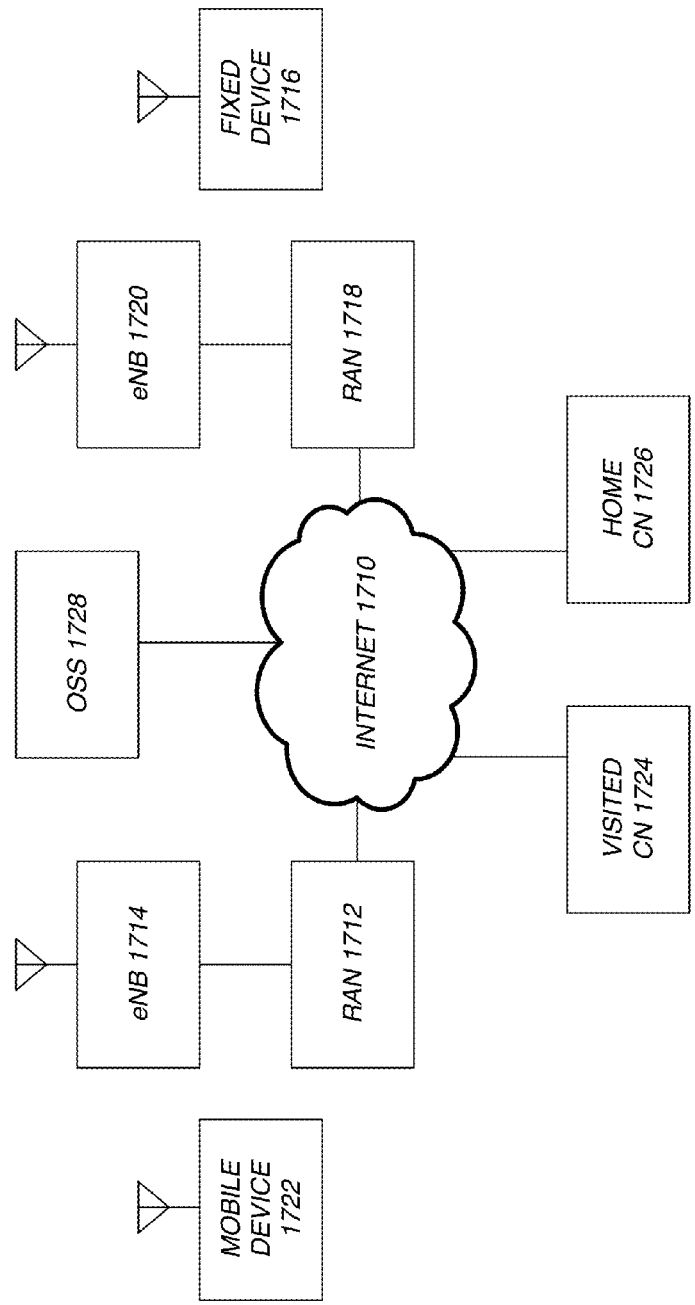
FIG. 17 an embodiment of a wireless network.

FIG. 17 illustrates an embodiment of a broadband wireless access system 1700. As shown in FIG. 17, broadband wireless access system 1700 may be an internet protocol (IP) type network comprising an internet 1710 type network or the like that is capable of supporting mobile wireless access and/or fixed wireless access to internet 1710. In one or more embodiments, broadband wireless access system 1300 may comprise any type of orthogonal frequency division multiple access (OFDMA)-based or single-carrier frequency division multiple access (SC-FDMA)-based wireless network, such as a system compliant with one or more of the 3GPP LTE Specifications and/or IEEE 802.16 Standards, and the scope of the claimed subject matter is not limited in these respects.

In the exemplary broadband wireless access system 1700, radio access networks (RANs) 1312 and 1318 are capable of coupling with evolved node Bs (eNBs) 1314 and 1320, respectively, to provide wireless communication between one or more fixed devices 1716 and internet 1710 and/or between or one or more mobile devices 1722 and Internet 1710. One example of a fixed device 1716 and a mobile device 1722 is device 1600 of FIG. 16, with the fixed device 1716 comprising a stationary version of device 1600 and the mobile device 1722 comprising a mobile version of device 1600. RANs 1712 and 1718 may implement profiles that are capable of defining the mapping of network functions to one or more physical entities on broadband wireless access system 1700. eNBs 1714 and 1720 may comprise radio equipment to provide RF communication with fixed device 1716 and/or mobile device 1722, such as described with reference to device 1600, and may comprise, for example, the PHY and MAC layer equipment in compliance with a 3GPP LTE Specification or an IEEE 802.16 Standard. eNBs 1714 and 1720 may further comprise an IP backbone to couple to Internet 1710 via RANs 1712 and 1718, respectively, although the scope of the claimed subject matter is not limited in these respects.

Broadband wireless access system 1700 may further comprise a visited core network (CN) 1724 and/or a home CN 1726, each of which may be capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or internet protocol (IP) type server functions, or the like. However, these are merely example of the types of functions that are capable of being provided by visited CN 1724 and/or home CN 1726, and the scope of the claimed subject matter is not limited in these respects. Visited CN 1324 may be referred to as a visited CN in the case where visited CN 1324 is not part of the regular service provider of fixed device 1716 or mobile device 1722, for example where fixed device 1716 or mobile device 1722 is roaming away from its respective home CN 1726, or where broadband wireless access system 1700 is part of the regular service provider of fixed device 1716 or mobile device 1722 but where broadband wireless access system 1700 may be in another location or state that is not the main or home location of fixed device 1716 or mobile device 1722. The embodiments are not limited in this context.

Fixed device 1716 may be located anywhere within range of one or both of eNBs 1714 and 1720, such as in or near a home or business to provide home or business customer broadband access to Internet 1710 via eNBs 1714 and 1720 and RANs 1712 and 1718, respectively, and home CN 1726. It is worthy of note that although fixed device 1716 is generally disposed in a stationary location, it may be moved to different locations as needed. Mobile device 1722 may be utilized at one or more locations if mobile device 1722 is within range of one or both of eNBs 1714 and 1720, for example. In accordance with one or more embodiments, operation support system (OSS) 1728 may be part of broadband wireless access system 1700 to provide management functions for broadband wireless access system 1700 and to provide interfaces between functional entities of broadband wireless access system 1700. Broadband wireless access system 1700 of FIG. 17 is merely one type of wireless network showing a certain number of the components of broadband wireless access system 1700, and the scope of the claimed subject matter is not limited in these respects.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware or firmware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus comprising logic, at least a portion of which is implemented in hardware or firmware, the logic to comprise a logical connection manager for a first device to manage logical connections with a set of devices, the logical connection manager to comprise addressing logic to determine a sequential current logical mesh network (LMN) address in a set of sequential LMN addresses corresponding to the set of devices, a master interface to connect to a slave interface of a second device within the set of devices, the second device having a sequentially next LMN address, and a slave interface to connect to a master interface of a third device within the set of devices, the third device having a sequentially previous LMN address.

Example 2 is the apparatus of Example 1, the logical connection manager to comprise packet processing logic to determine a destination address of a received LMN packet.

Example 3 is the apparatus of Example 2, the packet processing logic to send the received packet to an application layer by a network layer of the first device when the destination address of the received LMN packet is the current LMN address of the first device.

Example 4 is the apparatus of Example 3, the packet processing logic to forward the received LMN packet when the destination address is different than the current LMN address of the first device.

Example 5 is the apparatus of Example 4, the first device to comprise a host with a power state, the packet processing logic to forward the received LMN packet without causing the power state of the host to change.

Example 6 is the apparatus of Example 5, the packet processing logic to forward the received LMN packet based on forwarding information stored in a forwarding information of the first device.

Example 7 is the apparatus of Example 4 comprising a Bluetooth Low Energy Media Access Protocol Layer (BLE MAC).

Example 8 is the apparatus of Example 4 comprising a Bluetooth Low Energy (BLE) radio and an antenna.

Example 9 is the apparatus of Example 4 comprising a Bluetooth Low Energy (BLE) protocol stack.

Example 10 is the apparatus of Example 9 comprising a Long Term Evolution (LTE) protocol stack.

Example 11 is the apparatus of Example 6, the forwarding information to comprise an entry for each corresponding device in the set of devices, each entry indexed by the sequential LMN address of the corresponding device.

Example 12 is the apparatus of Example 11, the corresponding forwarding information entry to indicate which of the master interface or slave interface of the first device to use to forward the received LMN packet.

Example 13 is the apparatus of Example 4 wherein the first device uses a Generic Attribute Profile (GATT) write command to send a message from the master interface to a slave interface of the second device with the sequentially next LMN address.

Example 14 is the apparatus of Example 4 wherein the first device uses a Generic Attribute Profile (GATT) indication operation to send a message from the slave interface to a master interface of the third device with the sequentially previous LMN address.

Example 15 is the apparatus of Example 1, the addressing logic to determine one or both of a multicast address or a broadcast address.

Example 16 is a non-transitory machine readable storage medium comprising a set of instructions which when executed enable a first device in a set of a devices to determine a sequential current logical mesh network (LMN) address in a set of sequential LMN addresses corresponding to the set of devices, connect by a master interface, to a slave interface of a second device within the set of devices, the second device having a sequentially next LMN address, and connect by a slave interface, to a master interface of a third device within the set of devices, the third device having a sequentially previous LMN address.

Example 17 is the non-transitory machine readable medium of Example 16 comprising instructions which when executed enable the first device to determine a destination address of a received LMN packet.

Example 18 is the non-transitory machine readable medium of Example 17 comprising instructions which when executed enable the first device to send the received packet to an application layer by a network layer of the first device when the destination address of the received LMN packet is the current LMN address of the first device.

Example 19 is the non-transitory machine readable medium of Example claim 18 comprising instructions which when executed enable the first device to forward the received LMN packet when the destination address is different than the current LMN address of the first device.

Example 20 is the non-transitory machine readable medium of Example 19 comprising instructions which when executed enable the first device to forward the received LMN packet without causing a change to a host power state of the first device.

Example 21 is the non-transitory machine readable medium of Example 19 comprising instructions which when executed enable the first device to forward the received LMN packet based on forwarding information stored in a forwarding information of the first device.

Example 22 is the non-transitory machine readable medium of Example 19 comprising a Bluetooth Low Energy Media Access Protocol Layer (BLE MAC).

Example 23 is the non-transitory machine readable medium of Example 19 comprising a Bluetooth Low Energy (BLE) radio and an antenna.

Example 24 is the non-transitory machine readable medium of Example 19 comprising a Bluetooth Low Energy (BLE) protocol stack.

Example 25 is the non-transitory machine readable medium of Example 24 comprising a Long Term Evolution (LTE) protocol stack.

Example 26 is the non-transitory machine readable medium of Example 21 wherein the forwarding information is to comprise an entry for each corresponding device in the set of devices, each entry indexed by the sequential LMN address of the corresponding device.

Example 27 is the non-transitory machine readable medium of Example 26 comprising instructions which when executed enable the first device to forward the received LMN packet addressed to the corresponding device with the corresponding indexed sequential LMN address of that entry.

Example 28 is the non-transitory machine readable medium of Example 19 comprising instructions which when executed enable the first device to use a Generic Attribute Profile (GATT) write command to send a message from the master interface to a slave interface of the second device with the sequentially next LMN address.

Example 29 is the non-transitory machine readable medium of Example 19 comprising instructions which when executed enable the first device to use a Generic Attribute Profile (GATT) indication operation to send a message from the slave interface to a master interface of the third device with the sequentially previous LMN address.

Example 30 is the non-transitory machine readable medium of Example 16 comprising instructions which when executed enable the first device to determine one or both of a multicast address or a broadcast address.

Example 31 is a machine-implemented method for a first device in a set of devices, comprising determining a sequential current logical mesh network (LMN) address in a set of sequential LMN addresses corresponding to the set of devices, connecting, by a master interface, to a slave interface of a second device within the set of devices, the second device having a sequentially next LMN address, and connecting, by a slave interface, to a master interface of a third device within the set of devices, the third device having a sequentially previous LMN address.

Example 32 is the machine-implemented method of Example 31 comprising: determining a destination address of a received LMN packet.

Example 33 is the machine-implemented method of Example 32 comprising: sending the received LMN packet to an application layer by a network layer of the first device when the destination address of the received LMN packet is the current LMN address of the first device.

Example 34 is the machine-implemented method of Example 33 comprising: forwarding the received LMN packet when the destination address is different than the current LMN address of the first device.

Example 35 is the machine-implemented method of Example 34 comprising: forwarding the received LMN packet without causing a change to host power state of the first device.

Example 36 is the machine-implemented method of Example 34 comprising: forwarding the received LMN packet based on forwarding information stored in a forwarding information of the first device.

Example 37 is the machine-implemented method of Example 34 comprising: a Bluetooth Low Energy Media Access (BLE MAC) layer.

Example 38 is the machine-implemented method of Example 34 comprising: a Bluetooth Low Energy (BLE) radio and an antenna.

Example 39 is the machine-implemented method of Example 34 comprising: a Bluetooth Low Energy (BLE) protocol stack.

Example 40 is the machine-implemented method of Example 39 comprising: a Long Term Evolution (LTE) protocol stack.

Example 41 is the machine-implemented method of Example 36 wherein the forwarding information is to comprise an entry for each corresponding device in the set of devices, each entry indexed by the sequential LMN address of the corresponding device.

Example 42 is the machine-implemented method of Example 41 comprising: indicating, by the corresponding entry in the forwarding information, which of the master interface or slave interface of the first device to use to forward the received LMN packet.

Example 43 is the machine-implemented method of Example 34 comprising: using a Generic Attribute Profile (GATT) write command to send a message from the master interface to a slave interface of the second device with the sequentially next LMN address.

Example 44 is the machine-implemented method of Example 34 comprising: using a Generic Attribute Profile (GATT) indication operation to send a message from the slave interface to a master interface of the third device with the sequentially previous LMN address.

Example 45 is the machine-implemented method of Example 31 comprising: determining one or both of a multicast address or a broadcast address.

Example 46 is an apparatus comprising logical connection means for a first device to manage logical connections with a set of devices, the logical connection means to comprise means to determine a sequential current logical mesh network (LMN) address in a set of sequential LMN addresses corresponding to the set of devices, means to connect to a slave interface of a second device within the set of devices, the second device having a sequentially next LMN address, and means to connect to a master interface of a third device within the set of devices, the third device having a sequentially previous LMN address.

Example 47 is the apparatus of Example 46, the logical connection means to further comprise packet processing means to determine a destination address of a received LMN packet.

Example 48 is the apparatus of Example 47, the packet processing means to send the received packet to an application layer by a network layer of the first device when the destination address of the received LMN packet is the current LMN address of the first device.

Example 49 is the apparatus of Example 48, the packet processing means to further comprise forwarding means to forward the received LMN packet when the destination address is different than the current LMN address of the first device.

Example 50 is the apparatus of Example 49, the first device to further comprise a host with a power state, the forwarding means to forward the received LMN packet without causing the power state of the host to change Example 51 is the apparatus of Example 49, the forwarding means to forward the received LMN packet based on forwarding information stored in a forwarding information of the first device.

Example 52 is the apparatus of Example 49, the first device to further comprise a Bluetooth Low Energy Media Access (BLE MAC) layer.

Example 53 is the apparatus of Example 49, the first device to further comprise a Bluetooth Low Energy (BLE) radio and an antenna.

Example 54 is the apparatus of Example 49, the first device to further comprise a Bluetooth Low Energy (BLE) protocol stack.

Example 55 is the apparatus of Example 54, the first device to further comprise a Long Term Evolution (LTE) protocol stack.

Example 56 is the apparatus of Example 51, the forwarding information comprising an entry for each corresponding device in the set of devices, each entry indexed by the sequential LMN address of the corresponding device.

Example 57 is the apparatus of Example 56 to further comprise indication means to indicate which of the master interface or slave interface of the first device to use to forward a received packet addressed to the corresponding device with the corresponding indexed sequential LMN address of that entry.

Example 58 is the apparatus of Example 49 to further comprise command means to send a message from the master interface to a slave interface of the second device with the sequentially next LMN address.

Example 59 is the apparatus of Example 49 to further comprise command means to send a message from the slave interface to a master interface of the third device with the sequentially previous LMN address.

Example 60 is the apparatus of Example 49 to further comprise means to determine one or both of a multicast address or a broadcast address.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
logic, at least a portion of which is implemented in hardware or firmware, the logic to comprise a logical connection manager for a first device to manage logical connections with a set of devices, the logical connection manager to comprise:
addressing logic to determine a sequential current logical mesh network (LMN) address in a set of sequential LMN addresses corresponding to the set of devices;
a master interface to connect to a slave interface of a second device within the set of devices, the second device having a sequentially next LMN address; and
a slave interface to connect to a master interface of a third device within the set of devices, the third device having a sequentially previous LMN address.

2. The apparatus of claim 1, the logical connection manager to comprise packet processing logic to determine a destination address of a received LMN packet.

3. The apparatus of claim 2, the packet processing logic to send the received packet to an application layer by a network layer of the first device when the destination address of the received LMN packet is the current LMN address of the first device.

4. The apparatus of claim of claim 3, the packet processing logic to forward the received LMN packet when the destination address is different than the current LMN address of the first device.

5. The apparatus of claim 4, the first device to comprise a host with a power state, the packet processing logic to forward the received LMN packet without causing the power state of the host to change.

6. The apparatus of claim 4, the packet processing logic to forward the received LMN packet based on forwarding information stored in a forwarding information of the first device.

7. The apparatus of claim 6, the forwarding information to comprise an entry for each corresponding device in the set of devices, each entry indexed by the sequential LMN address of the corresponding device.

8. The apparatus of claim 7, the corresponding forwarding information entry to indicate which of the master interface or slave interface of the first device to use to forward the received LMN packet.

9. A non-transitory machine readable storage medium comprising a set of instructions which when executed enable a first device in a set of a devices to:
determine a sequential current logical mesh network (LMN) address in a set of sequential LMN addresses corresponding to the set of devices;
connect by a master interface, to a slave interface of a second device within the set of devices, the second device having a sequentially next LMN address; and
connect by a slave interface, to a master interface of a third device within the set of devices, the third device having a sequentially previous LMN address.

10. The non-transitory machine readable storage medium of claim 9 comprising instructions which when executed enable the first device to determine a destination address of a received LMN packet.

11. The non-transitory machine readable storage medium of claim 10 comprising instructions which when executed enable the first device to send the received packet to an application layer by a network layer of the first device when the destination address of the received LMN packet is the current LMN address of the first device.

12. The non-transitory machine readable storage medium of claim 11 comprising instructions which when executed enable the first device to forward the received LMN packet when the destination address is different than the current LMN address of the first device.

13. The non-transitory machine readable storage medium of claim 12 comprising instructions which when executed enable the first device to forward the received LMN packet without causing a change to a host power state of the first device.

14. The non-transitory machine readable storage medium of claim 12 comprising instructions which when executed enable the first device to forward the received LMN packet based on forwarding information stored in a forwarding information of the first device.

15. The non-transitory machine readable storage medium of claim 14 wherein the forwarding information is to comprise an entry for each corresponding device in the set of devices, each entry indexed by the sequential LMN address of the corresponding device.

16. The non-transitory machine readable storage medium of claim 15 comprising instructions which when executed enable the first device to forward the received LMN packet addressed to the corresponding device with the corresponding indexed sequential LMN address of that entry.

17. A machine-implemented method for a first device in a set of devices, comprising:
determining a sequential current logical mesh network (LMN) address in a set of sequential LMN addresses corresponding to the set of devices;
connecting, by a master interface, to a slave interface of a second device within the set of devices, the second device having a sequentially next LMN address; and
connecting, by a slave interface, to a master interface of a third device within the set of devices, the third device having a sequentially previous LMN address.

18. The machine-implemented method of claim 17 comprising: determining a destination address of a received LMN packet.

19. The machine-implemented method of claim 18 comprising: sending the received LMN packet to an application layer by a network layer of the first device when the destination address of the received LMN packet is the current LMN address of the first device.

20. The machine-implemented method of claim 19 comprising: forwarding the received LMN packet when the destination address is different than the current LMN address of the first device.

21. The machine-implemented method of claim 20 comprising: forwarding the received LMN packet without causing a change to host power state of the first device.

22. The machine-implemented method of claim 20 comprising: forwarding the received LMN packet based on forwarding information stored in a forwarding information of the first device.

23. The machine-implemented method of claim 22 wherein the forwarding information is to comprise an entry for each corresponding device in the set of devices, each entry indexed by the sequential LMN address of the corresponding device.

24. The machine-implemented method of claim 23 comprising: indicating, by the corresponding entry in the forwarding information, which of the master interface or slave interface of the first device to use to forward the received LMN packet.

\* \* \* \* \*